(12) United States Patent
Kim et al.

(10) Patent No.: US 11,610,424 B2
(45) Date of Patent: Mar. 21, 2023

(54) SYSTEMS AND METHODS FOR REGISTERING A FINGERPRINT BASED ON AN OPTICAL FINGERPRINT RECOGNITION

(71) Applicant: SAMSUNG ELECTRONICS CO., LTD., Suwon-si (KR)

(72) Inventors: Jongboo Kim, Seongnam-si (KR); Changeun Kang, Gimpo-si (KR); Seoungjae Yoo, Seongnam-si (KR); Yuncheol Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 16/796,456

(22) Filed: Feb. 20, 2020

(65) Prior Publication Data

US 2021/0012083 A1 Jan. 14, 2021

(30) Foreign Application Priority Data

Jul. 8, 2019 (KR) .......................... 10-2019-0081809

(51) Int. Cl.
*G06K 9/00* (2022.01)
*H04N 5/347* (2011.01)
*G06V 40/13* (2022.01)

(52) U.S. Cl.
CPC ............. *G06V 40/13* (2022.01); *H04N 5/347* (2013.01)

(58) Field of Classification Search
CPC .... H04N 5/347; H04N 5/35563; H04N 5/335; H04N 5/3765; G06K 9/00013; G06K 2009/0006; G06K 9/00026; G06K 9/00087; G06K 9/74; G06K 9/001
See application file for complete search history.

(56) References Cited

U.S. PATENT DOCUMENTS

| | | | |
|---|---|---|---|
| 7,402,789 B2 | 7/2008 | Bock | |
| 8,742,310 B2 | 6/2014 | Guezzi et al. | |
| 9,774,801 B2 | 9/2017 | Hseih et al. | |
| 9,819,889 B2 | 11/2017 | Solhusvik | |
| 2010/0253833 A1* | 10/2010 | Deever | H04N 9/04555 348/E5.034 |
| 2014/0263951 A1* | 9/2014 | Fan | H04N 5/378 250/208.1 |

(Continued)

FOREIGN PATENT DOCUMENTS

KR 10-2017-0066217 6/2017

*Primary Examiner* — Bobbak Safaipour
*Assistant Examiner* — Duy Tran
(74) *Attorney, Agent, or Firm* — F. Chau & Associates, LLC

(57) ABSTRACT

Systems and methods are described for registering a fingerprint based on optical fingerprint recognition. A fingerprint recognition window is displayed and a fingerprint frequency of a user fingerprint is analyzed based on reflected light received through the fingerprint recognition window using a fingerprint recognition sensor driven by a pixel binning scheme based on a first binning size. The first binning size may be evaluated based on the fingerprint frequency. If the first binning size is not appropriate for registering the user fingerprint, a second binning size is selected. Fingerprint information of the user fingerprint may be obtained again based on using the fingerprint recognition sensor driven by a pixel binning scheme based on the second binning size.

20 Claims, 19 Drawing Sheets

(56) References Cited

U.S. PATENT DOCUMENTS

| | | | |
|---|---|---|---|
| 2015/0350575 A1* | 12/2015 | Agranov | H04N 5/37457 348/302 |
| 2017/0032165 A1* | 2/2017 | Hansen | G06V 40/1335 |
| 2017/0142446 A1 | 5/2017 | Leleannec et al. | |
| 2017/0302866 A1* | 10/2017 | Fu | H04N 5/37455 |
| 2018/0012054 A1* | 1/2018 | Apostolos | G06V 10/803 |
| 2018/0025199 A1* | 1/2018 | Ryshtun | G06V 40/1306 382/125 |
| 2018/0129798 A1* | 5/2018 | He | G06V 10/141 |
| 2018/0146148 A1* | 5/2018 | Kaneko | H04N 5/37457 |
| 2018/0269245 A1 | 9/2018 | Mlinar et al. | |
| 2019/0019835 A1 | 1/2019 | Tanaka | |

\* cited by examiner

| P | P | P | P | P | P | P | P | P | P | P | P |
|---|---|---|---|---|---|---|---|---|---|---|---|
| P | P | P | P | P | P | P | P | P | P | P | P |
| P | P | P | P | P | P | P | P | P | P | P | P |
| P | P | P | P | P | P | P | P | P | P | P | P |
| P | P | P | P | P | P | P | P | P | P | P | P |
| P | P | P | P | P | P | P | P | P | P | P | P |
| P | P | P | P | P | P | P | P | P | P | P | P |
| P | P | P | P | P | P | P | P | P | P | P | P |
| P | P | P | P | P | P | P | P | P | P | P | P |
| P | P | P | P | P | P | P | P | P | P | P | P |
| P | P | P | P | P | P | P | P | P | P | P | P |
| P | P | P | P | P | P | P | P | P | P | P | P |

| PA | PA | PA | PA | PA | PA |
|----|----|----|----|----|----|
| PA | PA | PA | PA | PA | PA |
| PA | PA | PA | PA | PA | PA |
| PA | PA | PA | PA | PA | PA |
| PA | PA | PA | PA | PA | PA |
| PA | PA | PA | PA | PA | PA |

| PB | PB | PB | PB |
|----|----|----|----|
| PB | PB | PB | PB |
| PB | PB | PB | PB |
| PB | PB | PB | PB |

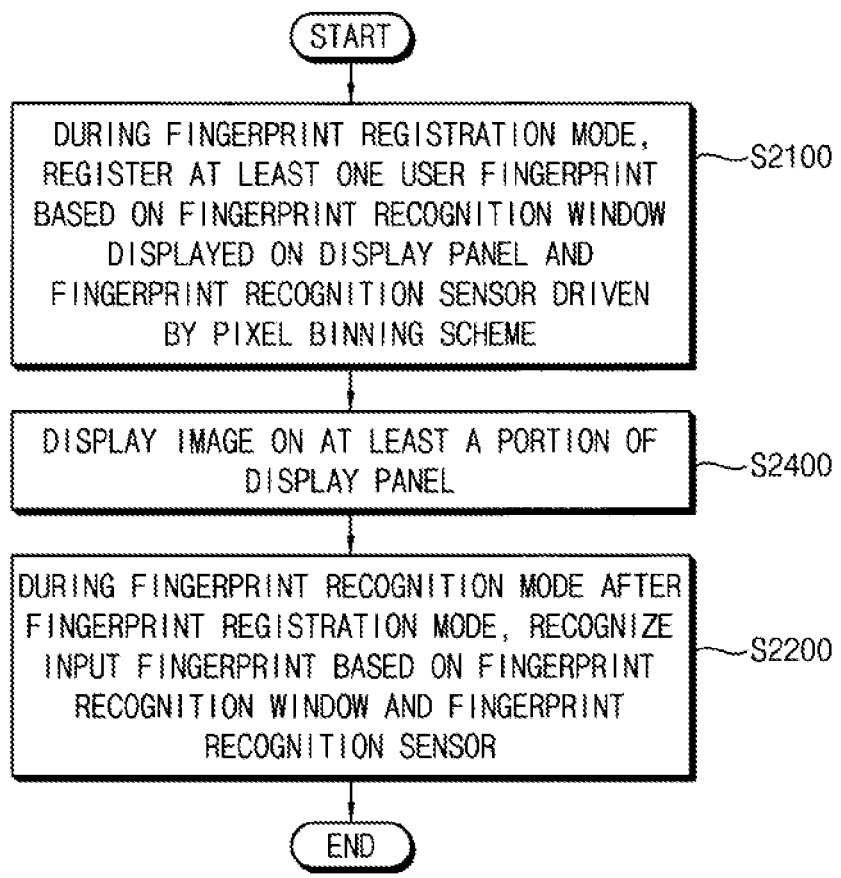

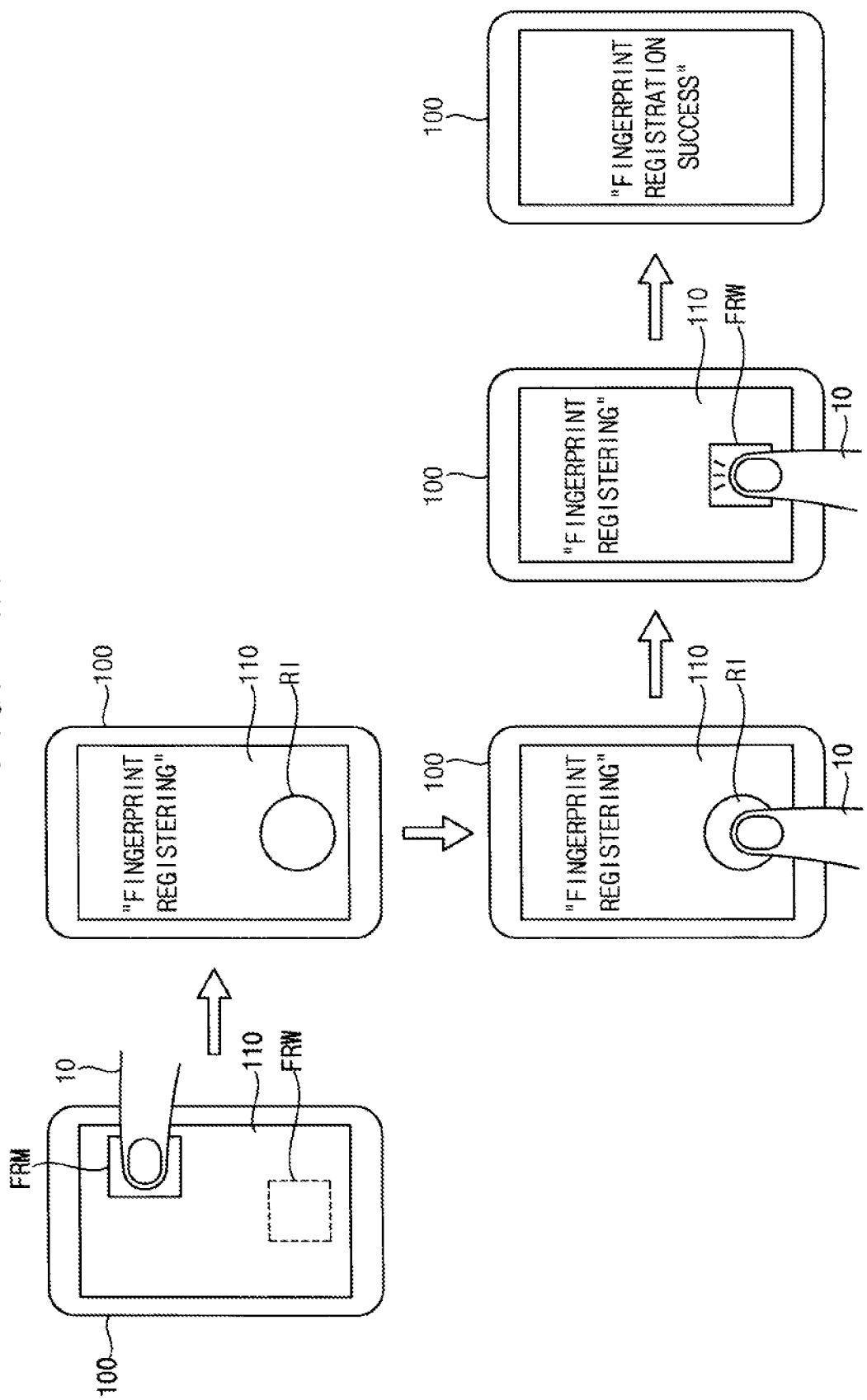

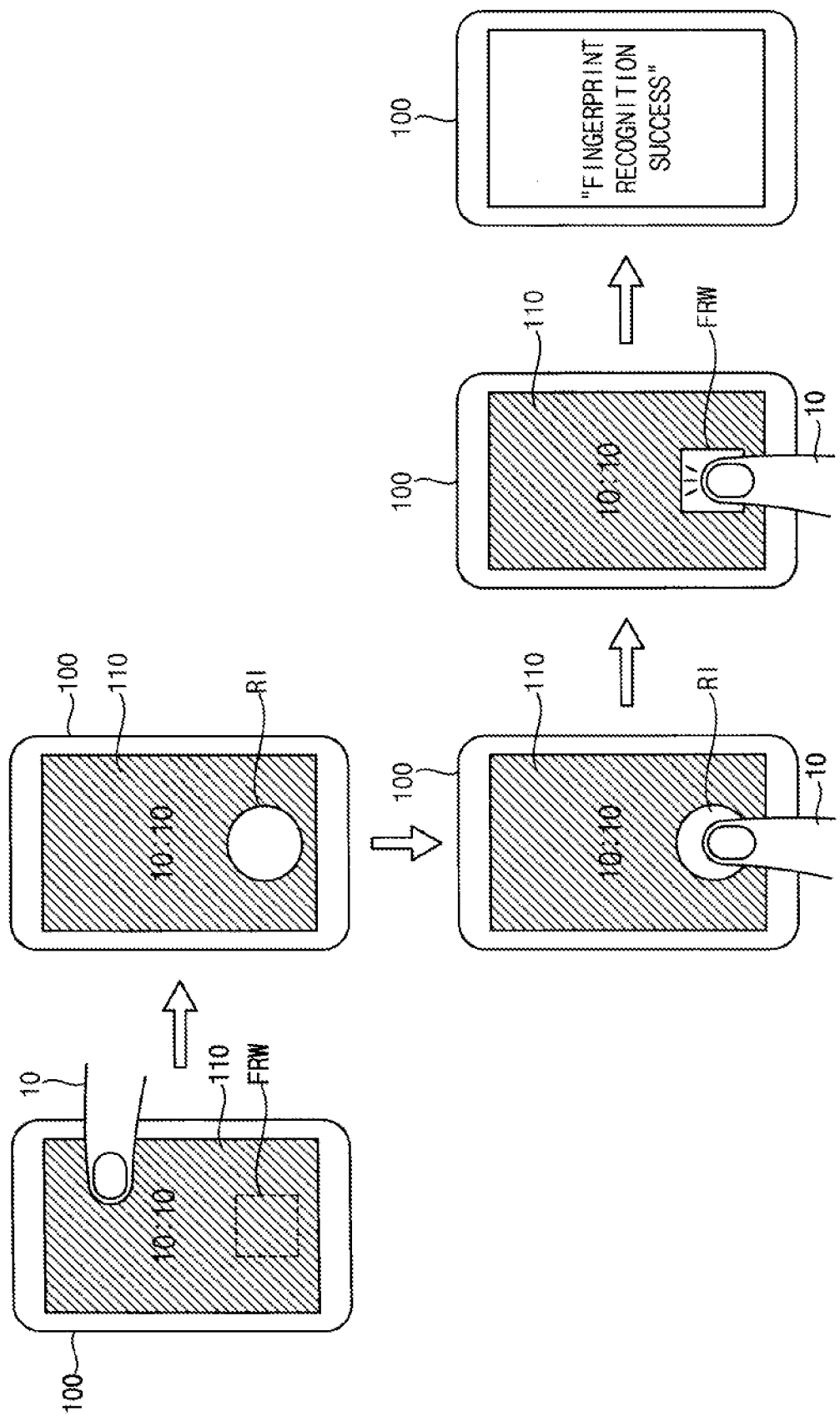

SYSTEMS AND METHODS FOR REGISTERING A FINGERPRINT BASED ON AN OPTICAL FINGERPRINT RECOGNITION

CROSS-REFERENCE TO RELATED APPLICATION

This application claims priority under 35 USC § 119 to Korean Patent Application No. 10-2019-0081809, filed on Jul. 8, 2019 in the Korean Intellectual Property Office (KIPO), the contents of which are incorporated by reference herein in their entirety.

BACKGROUND

1. Technical Field

Example embodiments relate generally to semiconductor integrated circuits, and more particularly to methods of registering fingerprints based on optical fingerprint recognition, methods of performing optical fingerprint recognition using the methods of registering fingerprint, and electronic devices performing the methods of registering fingerprint and the methods of performing optical fingerprint recognition.

2. Description of the Related Art

Secure access to personal or commercial electronic devices is an important privacy and security feature. Electronic devices use passwords, pin numbers, patterns, fingerprints, and other techniques to ensure limited access to a user interface. Fingerprints in particular serve as a useful method for determining a user's identity for device access.

Fingerprint recognition uses imaging sensors to recognize a user's fingerprint, based on differences in the light reflected off the ridges and valleys of a fingertip. Since the differences in reflected light from a finger can be very small, accurate fingerprint imaging can be difficult.

When the pixel size of an image sensor used in fingerprint recognition is large, a large amount of light enters the sensor. The large amount of light assists in deciphering reflected light off valleys and ridges of a fingerprint. However, using large pixels may cause difficulty in distinguishing the fine features of a fingerprint.

Furthermore, the characteristics of reflected light passing through a display panel may vary depending on pixel size or panel structure. Accordingly, the performance of an image sensor may be in different electronic devices. Changing the design of a fingerprint sensor for each device may increase costs and reduce reliability. Therefore, there is a need in the art for a fingerprint recognition system that can be used in various display devices, regardless of display structure, without a redesign of the fingerprint recognition system.

SUMMARY

At least one example embodiment of the present disclosure provides a method of registering fingerprint based on optical fingerprint recognition capable of efficiently enrolling fingerprint using pixel binning scheme. At least one example embodiment of the present disclosure provides a method of performing optical fingerprint recognition capable of efficiently detecting fingerprint using pixel binning scheme. At least one example embodiment of the present disclosure provides an electronic device performing the method of registering fingerprint and the method of performing optical fingerprint recognition.

According to example embodiments, in a method of registering fingerprint based on optical fingerprint recognition, a fingerprint recognition window is displayed on at least a part of a display panel. A first fingerprint frequency of a first user fingerprint to be registered is analyzed based on reflected light received through the fingerprint recognition window using a fingerprint recognition sensor driven by a pixel binning scheme based on a first binning size. It is determined based on the first fingerprint frequency whether the first binning size is appropriate for registering the first user fingerprint. When the first binning size is not appropriate for registering the first user fingerprint, a second binning size different from the first binning size is selected. First fingerprint information of the first user fingerprint is obtained based on reflected light received through the fingerprint recognition window using the fingerprint recognition sensor driven by a pixel binning scheme based on the second binning size.

According to example embodiments, in a method of performing optical fingerprint recognition, during a fingerprint registration mode, at least one user fingerprint is registered based on a fingerprint recognition window displayed on a display panel and a fingerprint recognition sensor driven by a pixel binning scheme. During a fingerprint recognition mode after the fingerprint registration mode, an input fingerprint is recognized based on the fingerprint recognition window using the fingerprint recognition sensor. When registering the at least one user fingerprint, the fingerprint recognition window is displayed on at least a part of the display panel. A first fingerprint frequency of a first user fingerprint to be registered is analyzed based on reflected light received through the fingerprint recognition window using the fingerprint recognition sensor driven by a pixel binning scheme based on a first binning size. It is determined based on the first fingerprint frequency whether the first binning size is appropriate for registering the first user fingerprint. When the first binning size is not appropriate for registering the first user fingerprint, a second binning size different from the first binning size is selected. First fingerprint information of the first user fingerprint is obtained based on reflected light received through the fingerprint recognition window using the fingerprint recognition sensor driven by a pixel binning scheme based on the second binning size to store the first fingerprint information.

According to example embodiments, an electronic device includes a display panel, a fingerprint recognition sensor and a processor. The display panel displays an image and displays a fingerprint recognition window on a partial region. The fingerprint recognition sensor is driven by a pixel binning scheme and performs a fingerprint registration and a fingerprint recognition. The processor controls operations of the display panel and the fingerprint recognition sensor. The processor analyzes a first fingerprint frequency of a first user fingerprint to be registered based on reflected light received through the fingerprint recognition window using a fingerprint recognition sensor driven by a pixel binning scheme based on a first binning size, determines based on the first fingerprint frequency whether the first binning size is appropriate for registering the first user fingerprint, selects a second binning size different from the first binning size when the first binning size is not appropriate for registering the first user fingerprint, and obtains first fingerprint information of the first user fingerprint based on reflected light received through the fingerprint recognition window using the fingerprint recognition sensor driven by a pixel binning scheme based on the second binning size to store the first fingerprint information.

In the method of registering fingerprint based on optical fingerprint recognition and the method of performing optical fingerprint recognition according to example embodiments, the fingerprint registration/recognition may be performed by using the fingerprint recognition sensor which is driven based on the pixel binning scheme. The pixel binning scheme may be basically applied, and thus a pixel signal having a desired size may be output by generating one pixel signal by combining pixels of small size. Accordingly, the compatibility between the fingerprint recognition sensor and the display panel may be increased, and the performance of the fingerprint recognition may be improved as the influence of each pixel in the fingerprint recognition sensor is reduced.

In addition, the fingerprint recognition sensor may be driven by an active, adaptive or smart pixel binning scheme in which the binning size is changed according to a fingerprint frequency of a user fingerprint. The binning size associated with the pixel binning scheme may be adaptively changed, an optimized pixel size that satisfies the characteristics required by the fingerprint sensor and the electronic device may be efficiently determined, and thus the performance of the fingerprint recognition may be further improved.

According to another embodiment, a method of fingerprint recognition is described. The method may include selecting a first pixel binning scheme for a fingerprint recognition sensor; identifying first fingerprint information using the fingerprint recognition sensor based on the first pixel binning scheme; determining that the first pixel binning scheme is unsuitable based on the first fingerprint information; selecting a second pixel binning scheme for the fingerprint sensor based on the determination, wherein the second pixel binning scheme comprises a different binning size from the first pixel binning scheme; and identifying second fingerprint information using the fingerprint recognition sensor based on the second pixel binning scheme.

BRIEF DESCRIPTION OF THE DRAWINGS

Illustrative, non-limiting example embodiments will be more clearly understood from the following detailed description taken in conjunction with the accompanying drawings.

FIGS. 4A, 4B, 4C and 4D are diagrams for describing pixel binning scheme of a fingerprint recognition sensor used in a method of registering fingerprint based on optical fingerprint recognition according to example embodiments.

FIGS. 13 and 14 are flowcharts illustrating a method of performing optical fingerprint recognition according to example embodiments.

FIGS. 15A and 15B are diagrams illustrating example processes for a method of performing optical fingerprint recognition according to example embodiments.

DETAILED DESCRIPTION OF THE EMBODIMENTS

Figure 1:
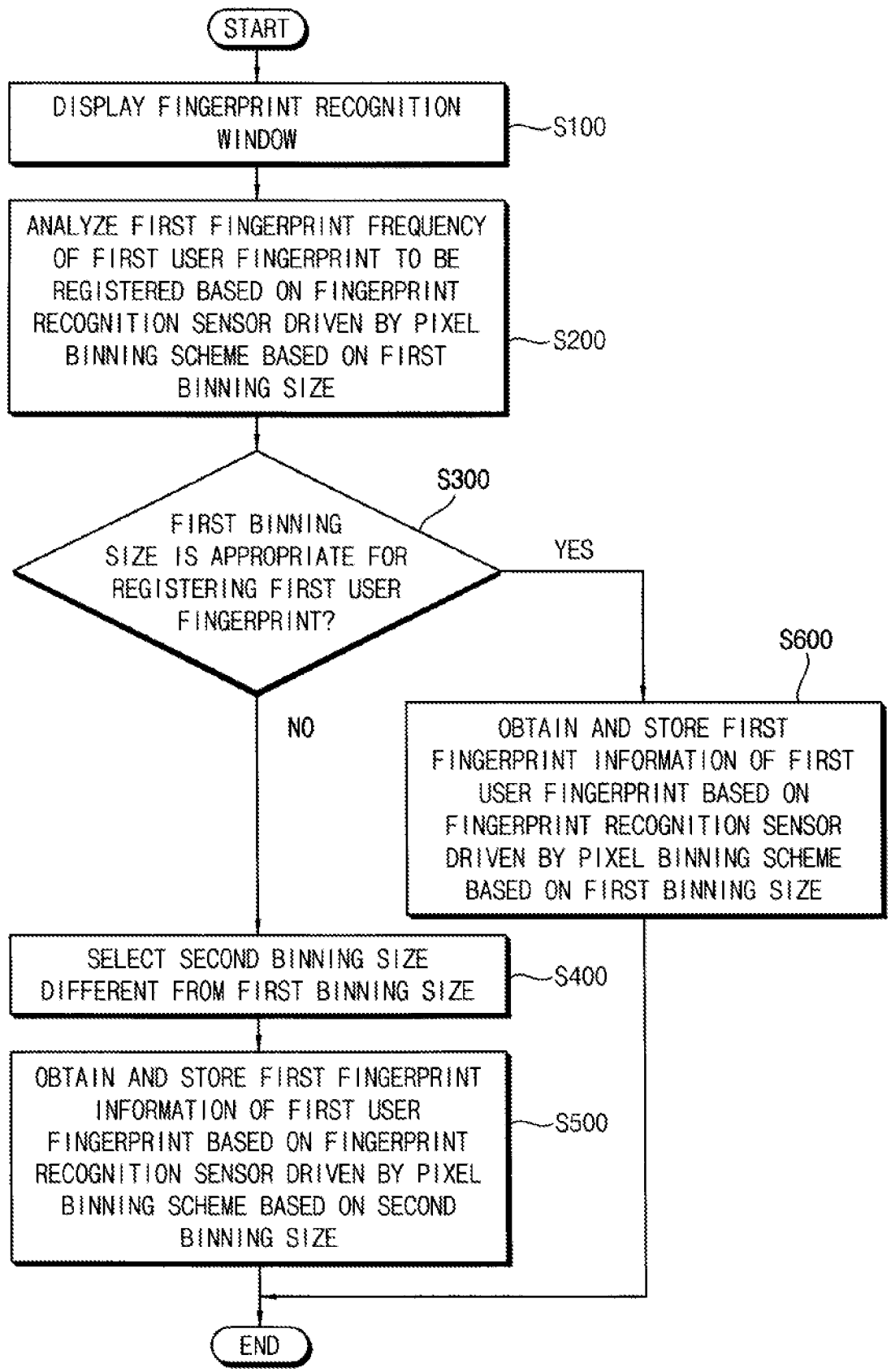
FIG. 1 is a flowchart illustrating a method of registering fingerprint based on optical fingerprint recognition according to example embodiments.

According to embodiments of the present disclosure, a fingerprint recognition sensor may be adjusted to have pixel characteristics of a desired size by combining small size pixels. Due to the capacity to make dynamic adjustments, compatibility between the fingerprint recognition sensor and a display panel may be increased when manufacturing a mobile device. Accordingly, performance of the fingerprint recognition may be increased, and the manufacturing defect rate may also be reduced, as the influence of each pixel in the fingerprint recognition sensor is reduced.

Further, a pixel binning scheme is described that may be used in an image sensor to perform a variety of functions. The pixel binning scheme is applied to a fingerprint recognition sensor in the present disclosure as an example, but may also have a variety of other applications.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of registering fingerprint based on optical fingerprint recognition according to example embodiments.

Referring to FIG. 1, a method of registering a fingerprint based on optical fingerprint recognition, according to example embodiments, is performed by an electronic device. The electronic device includes a display panel and a fingerprint recognition sensor. The display panel includes a plurality of light sources, and the fingerprint recognition sensor performs the optical fingerprint recognition using light provided from the plurality of light sources. A detailed configuration of the electronic device will be described with reference to FIGS. 2 through 5.

In the method of registering fingerprint based on optical fingerprint recognition according to example embodiments, a fingerprint recognition window is displayed on at least a part of the display panel (step S100). For example, a subset of light sources among the plurality of light sources included in the display panel may be driven to display the fingerprint recognition window. The subset of light sources may be disposed to correspond to the fingerprint recognition window which is the partial region of the display panel. For example, all of the subset of light sources may be substantially simultaneously or concurrently turned on or emit light.

A first fingerprint frequency of a first user fingerprint to be registered is analyzed based on reflected light received through the fingerprint recognition window using the fingerprint recognition sensor driven by a pixel binning scheme based on a first binning size (step S200). For example, light generated from the subset of light sources may be reflected by an object (e.g., a user's finger including the first user fingerprint) on the fingerprint recognition window. The reflected light of the object may be provided to the fingerprint recognition sensor. As a result, the fingerprint recognition sensor may obtain data associated with the first fingerprint frequency based on the reflected light of the object.

For example, a fingerprint frequency may correspond to the density of ridges and valleys in a fingerprint. If the fingerprint frequency is high (corresponding to a high density of fingerprint features, which may be relatively small), it may be appropriate to use a smaller pixels (or smaller pixel bins). On the other hand, if the fingerprint frequency is low (corresponding to a low density of fingerprint features, which may be relatively large) it may be appropriate to use larger pixels (or pixels bins).

In some example embodiments, the first binning size may be one of a value between a minimum binning size and a maximum binning size. In other words, the first binning size may be greater than or equal to the minimum binning size and less than or equal to the maximum binning size. For example, the first binning size may be pre-set, pre-determined and pre-stored when an electronic device including the display panel and the fingerprint recognition sensor is manufactured. The first binning size may be referred to as an initial binning size and/or a default binning size. The pixel binning scheme will be described with reference to FIGS. 4A through 4D.

To register the first user fingerprint (step S300), the first binning size is determined based on the first fingerprint frequency. For example, the determination operation of step S300 may be performed based on a lookup table pre-stored and includes a relationship between fingerprint frequencies and binning sizes.

When the first binning size is not appropriate for registering the first user fingerprint (step S300: NO), a second binning size different from the first binning size is selected (step S400). First fingerprint information about the first user fingerprint is obtained based on reflected light received through the fingerprint recognition window using the fingerprint recognition sensor driven by a pixel binning scheme based on the second binning size to store the first fingerprint information (step S500). In other words, the binning size associated with the pixel binning scheme may change to be suitable for registering the first user fingerprint. As a result, the fingerprint registration may be performed based on the changed binning size. For example, as with the first binning size, the second binning size may be one of the values between the minimum binning size and the maximum binning size.

When the first binning size is appropriate for registering the first user fingerprint (step S300: YES), the first fingerprint information is obtained based on reflected light received through the fingerprint recognition window using the fingerprint recognition sensor. The fingerprint recognition sensor is driven by the pixel binning scheme based on the first binning size to store the first fingerprint information (step S600). In other words, the binning size associated with the pixel binning scheme may be maintained, and the fingerprint registration may be performed while maintaining the binning size.

In the method of registering a fingerprint based on optical fingerprint recognition, according to example embodiments, the fingerprint registration/recognition may be performed by using the fingerprint recognition sensor. In this case, the fingerprint recognition sensor is driven based on the pixel binning scheme. Unlike a conventional technique of designing pixels included in a fingerprint recognition sensor depending on characteristics of a display panel, the pixel binning scheme may be applied in the present disclosure. As a result, a pixel signal with a certain size may be output by generating one pixel signal by combining pixels of small size. Accordingly, the compatibility between the fingerprint recognition sensor and the display panel may be increased. As a result, performance of the fingerprint recognition may be increased due to the influence of each pixel in the fingerprint recognition sensor is reduced.

In addition, the method of registering fingerprint based on optical fingerprint recognition, according to example embodiments, the fingerprint recognition sensor may be driven by an active, adaptive, or smart pixel binning scheme. An active, adaptive, or smart pixel binning scheme provides for the binning size to be changed, according to a fingerprint frequency of a user fingerprint. The binning size associated with the pixel binning scheme may be adaptively changed. As a result, an optimized pixel size that satisfies the characteristics used by the fingerprint sensor and the electronic device may be efficiently determined. As a result, the performance of the fingerprint recognition may be further increased.

Figure 2:
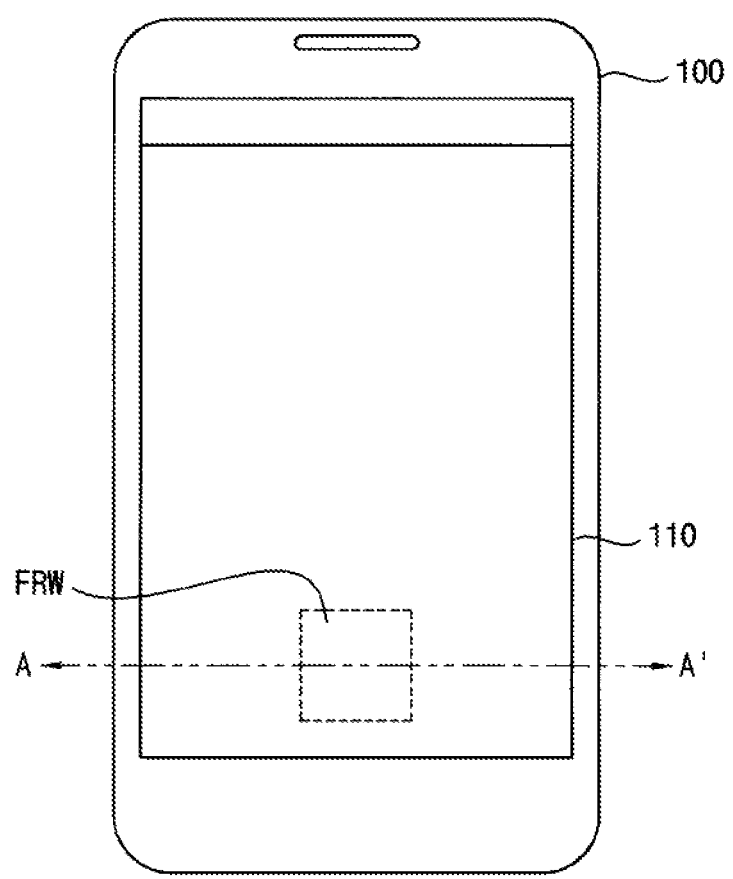
FIG. 2 is a plan view of an electronic device according to example embodiments.

FIG. 2 is a plan view of an electronic device according to example embodiments.

Referring to FIG. 2, an electronic device 100 includes a display panel 110 to interface with a user. The display panel 110 outputs visual information to the user. Although not illustrated in FIG. 2, the electronic device 100 may further include a touch sensor panel for sensing a touch input of the user. The user may input a signal to the electronic device 100 through the touch sensor panel.

A fingerprint recognition window FRW may be provided on the display panel 110. As will be described with reference to FIG. 3A, a fingerprint recognition sensor for fingerprint detection may be disposed to spatially correspond to a location of the fingerprint recognition window FRW. Although the fingerprint recognition window FRW is illustrated as a rectangle in FIG. 2 and subsequent figures, a shape of the fingerprint recognition window FRW may be changed according to example embodiments.

In some example embodiments, the electronic device 100 may be or include any mobile system, such as a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The present disclosure may provide an interface used to detect a fingerprint. For example, a function of fingerprint detection may be performed when the user contacts or approaches the touch sensor panel or the display panel 110. According to the present disclosure, the interface and the fingerprint recognition sensor used for fingerprint detection may share an area on the electronic device 100 with the touch sensor panel and the display panel 110. As a result, the interface and the fingerprint recognition sensor may not use an additional area on the electronic device 100. Accordingly, a reduced size of the electronic device 100 may be possible. Additionally, a spare area of the electronic device 100 may be used for other features.

Figure 3A:
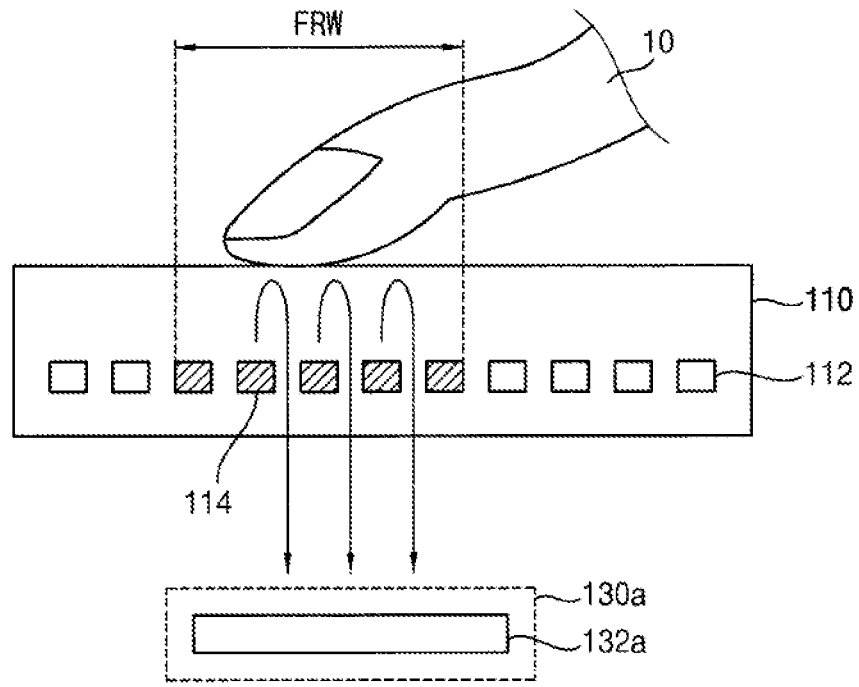
FIGS. 3A, 3B and 3C are cross-sectional views of examples of the electronic device taken along a line A-A' of FIG. 2.
Figure 3B:
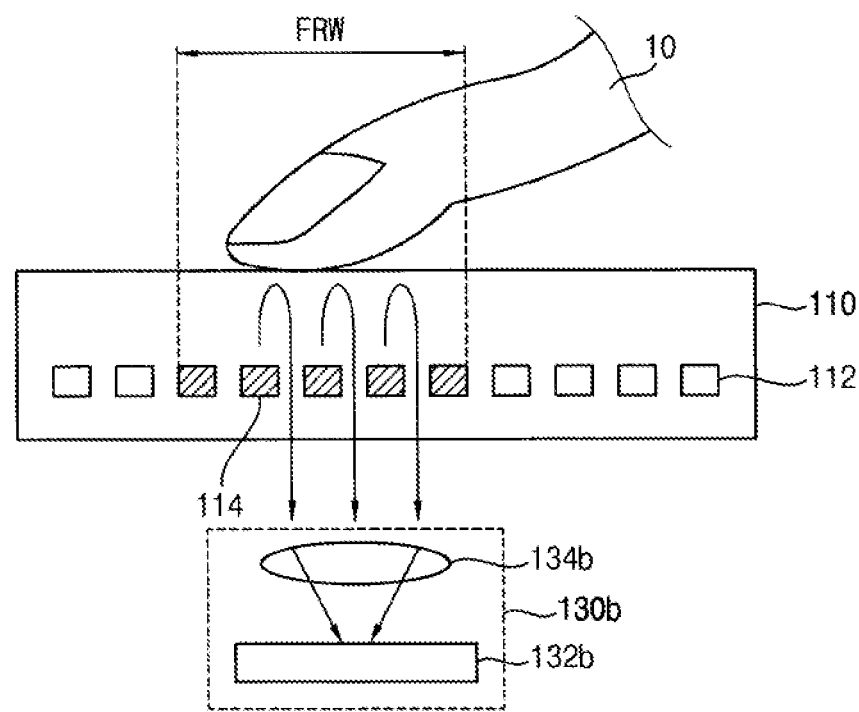
Figure 3C:
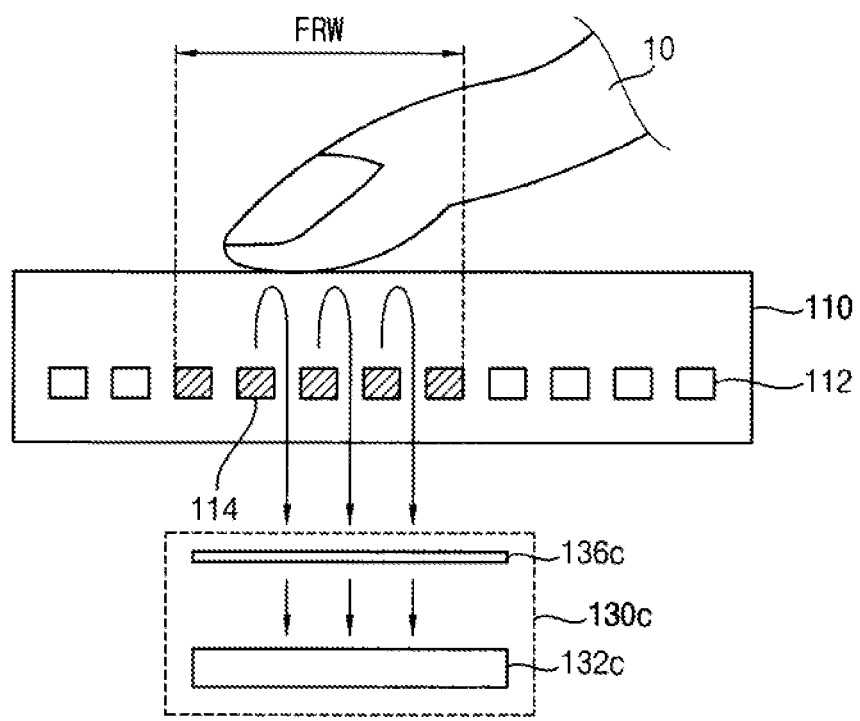

FIGS. 3A, 3B and 3C are cross-sectional views of examples of the electronic device taken along a line A-A' of FIG. 2.

Referring to FIG. 3A, the fingerprint recognition window FRW may be displayed on a partial region (or portion) of the display panel 110 in a fingerprint registration mode and/or a fingerprint recognition mode. The display panel 110 may include a plurality of light sources 112. For example, as will be described with reference to FIG. 5, the plurality of light sources 112 may be included in a plurality of pixels included in the display panel 110.

Among the plurality of light sources 112, a subset of light sources 114 that are disposed to correspond to the fingerprint recognition window FRW may be driven substantially simultaneously. In FIG. 3A, the light sources 114 that are driven and emit light are hatched.

A fingerprint recognition sensor 130a may be disposed under the display panel 110 such that the fingerprint recognition sensor 130a may overlap the fingerprint recognition window FRW in a vertical direction. In other words, the display panel 110 may include a first surface on which an image is displayed and a second surface opposite to the first surface. Additionally, the fingerprint recognition sensor 130a may be disposed under the second surface of the display panel 110.

The fingerprint recognition sensor 130a may include an image sensor 132a. The image sensor 132a may be an optical sensor. The image sensor 132a may be disposed under the display panel 110 and may generate an image signal for an object on the partial region based on reflected light received through the fingerprint recognition window FRW. The fingerprint recognition sensor 130a in FIG. 3A may be implemented in a direct manner in which the image sensor 132a directly receives the reflected light.

For example, as illustrated in FIG. 3A, when a user puts a finger 10 on the fingerprint recognition window FRW, the light generated from the light sources 114 within the fingerprint recognition window FRW may be reflected by a fingerprint of the finger 10. The reflected light of the fingerprint may be provided to the fingerprint recognition sensor 130a. The fingerprint recognition sensor 130a may capture an image signal for the fingerprint or information associated with a shape of the fingerprint (e.g., a fingerprint image) based on the reflected light of the fingerprint received through the fingerprint recognition window FRW.

In some example embodiments, the display panel 110 may be implemented in a rigid or a flexible configuration. A size of the image sensor 132a may correspond to a size of the fingerprint recognition window FRW. An effective pixel size of the image sensor 132a may be implemented to satisfy the characteristics of the display panel 110.

Referring to FIG. 3B, an example of FIG. 3B may be substantially the same as the example of FIG. 3A except that a fingerprint recognition sensor 130b in FIG. 3B includes an image sensor 132b and a lens 134b. This, repeated descriptions will be omitted.

The lens 134b may be disposed under the display panel 110 (e.g., disposed between the display panel 110 and the image sensor 132b). The lens 134b may concentrate reflected light received through the fingerprint recognition window FRW on the image sensor 132b. The image sensor 132b may be disposed under the lens 134b, and may generate an image signal for an object on the partial region based on the reflected light concentrated by the lens 134b. The fingerprint recognition sensor 130b in FIG. 3B may be implemented in the form of a compact camera module (CCM) including the image sensor 132b and the lens 134b.

In some example embodiments, a size of the image sensor 132b may be changed depending on a distance between the display panel 110, the lens 134b, and the image sensor 132b, or may be changed depending on a structure of the lens 134b. In particular, since the lens 134b concentrates the reflected light, an area of the image sensor 132b in FIG. 3B may be smaller than that of the image sensor 132a in FIG. 3A in a plan view or on the plane when a size of the fingerprint recognition window FRW is the same.

Referring to FIG. 3C, an example of FIG. 3C may be substantially the same as the example of FIG. 3A except that a fingerprint recognition sensor 130c in FIG. 3C includes an image sensor 132c and an optical filter 136c. Thus, repeated descriptions be omitted.

The optical filter 136c may be disposed under the display panel 110 (e.g., disposed between the display panel 110 and the image sensor 132c). The optical filter 136c may adjust a frequency characteristic and/or a polarization characteristic of reflected light received through the fingerprint recognition window FRW. The image sensor 132b may be disposed under the optical filter 136c and may generate an image signal for an object on the partial region based on the reflected light filtered by the optical filter 136c.

In some example embodiments, the optical filter 136c may be embedded in the image sensor 132c or attached to a surface of the image sensor 132c.

Although not illustrated in FIGS. 3A, 3B and 3C, the fingerprint recognition sensor may include a part of the image sensor, the lens, and the optical filter. For example, the lens, the optical filter, and the image sensor may be sequentially disposed under the display panel. The optical filter may be disposed in a lens barrel according to example embodiments.

FIGS. 4A, 4B, 4C, and 4D are diagrams for describing pixel binning scheme of a fingerprint recognition sensor used in a method of registering fingerprint based on optical fingerprint recognition according to example embodiments.

Referring to FIG. 4A, an image sensor (e.g., the image sensor 132a in FIG. 3A) included in the fingerprint recognition sensor may include a pixel array 131a.

FIG. 4A illustrates the pixel array 131a driven by a general driving scheme rather than by pixel binning scheme. The pixel array 131a may include a plurality of pixels (or unit pixels) P that are arranged in a matrix formation. Each of the plurality of pixels P may be connected to a respective one of a plurality of rows and a respective one of a plurality of columns. For convenience of illustration, FIG. 4A illustrates the pixel array 131a including 144 pixels P.

Each of the plurality of pixels P may perform photoelectric conversion based on incident light and may generate a respective one of a plurality of analog pixel signals corresponding to the incident light. The plurality of pixels P may be physically separated or distinguished from each other. As a result, one analog pixel signal may be generated from each pixel.

Referring to FIG. 4B, an example where the pixel array 131a of FIG. 4A is driven by 2*2 pixel binning scheme is illustrated. In other words, FIG. 4B illustrates a pixel array 131b driven by a pixel binning scheme based on a binning size "2".

Each of a plurality of binning pixels PA included in the pixel array 131*b* of FIG. 4B may correspond to four pixels arranged in a 2*2 matrix formation among the plurality of pixels P in FIG. 4A. For example, one binning pixel signal for one binning pixel in FIG. 4B may be generated by summing four analog pixel signals generated from four pixels arranged in a 2*2 matrix formation in FIG. 4A. As a result, a reduced number of binning pixels PA may be used to drive the pixel array 131*b* (e.g., from 144 to 36). Therefore, effective sensing may be performed even if the amount of incident light is reduced.

In some example embodiments, the pixel binning scheme may be implemented by changing a readout method from the pixel array 131*b* or by changing a digital processing method of an image sensor including the pixel array 131*b*. For example, the pixel binning scheme may be implemented as a charge binning scheme in which photocharges collected in pixels are summed and read out. Additionally or alternatively, a digital binning scheme may be implemented in which analog pixel signals output from pixels are summed after digital conversion.

Referring to FIG. 4C, an example where the pixel array 131*a* of FIG. 4A is driven by 3*3 pixel binning scheme is illustrated. In other words, FIG. 4C illustrates a pixel array 131*c* driven by a pixel binning scheme based on a binning size "3".

Each of a plurality of binning pixels PB included in the pixel array 131*c* of FIG. 4C may correspond to nine pixels arranged in a 3*3 matrix formation among the plurality of pixels P in FIG. 4A. For example, one binning pixel signal for one binning pixel in FIG. 4C may be generated by summing nine analog pixel signals generated from nine pixels arranged in a 3*3 matrix formation in FIG. 4A. As a result, 16 binning pixels PB may be used to drive the pixel array 131*c* instead of 144 pixels P.

Figure 4D:
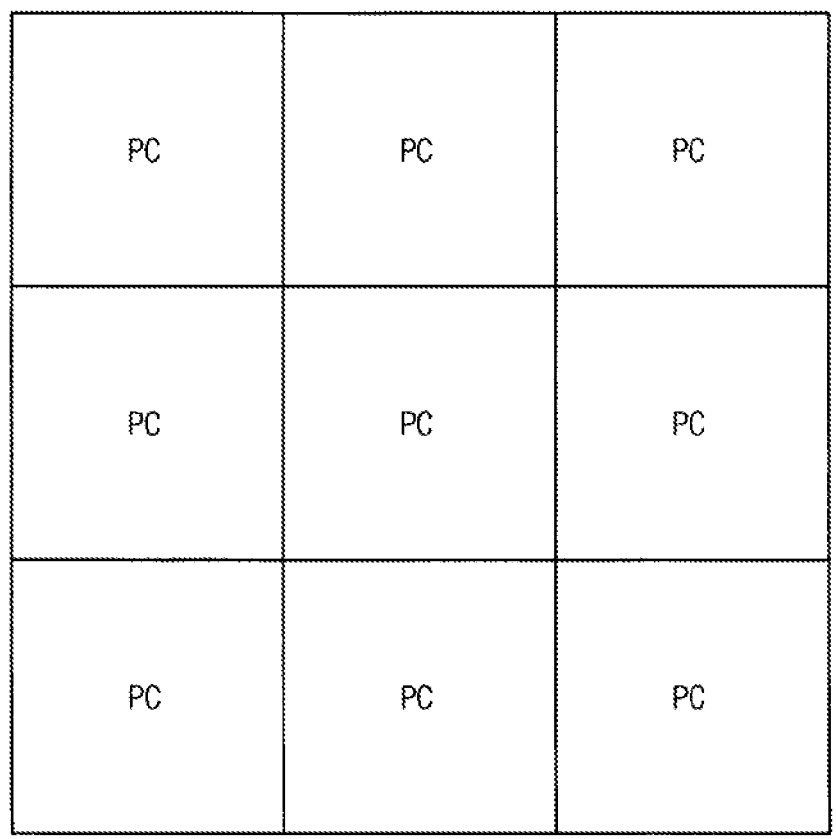

Referring to FIG. 4D, an example where the pixel array 131*a* of FIG. 4A is driven by 4*4 pixel binning scheme is illustrated. In other words, FIG. 4D illustrates a pixel array 131*d* driven by a pixel binning scheme based on a binning size "4".

Each of a plurality of binning pixels PC included in the pixel array 131*d* of FIG. 4D may correspond to sixteen pixels arranged in a 4*4 matrix formation among the plurality of pixels P in FIG. 4A. For example, one binning pixel signal for one binning pixel in FIG. 4D may be generated by summing sixteen analog pixel signals generated from sixteen pixels arranged in a 4*4 matrix formation in FIG. 4A. As a result, 9 binning pixels PC may be used to drive the pixel array 131*d* instead of 144 pixels P.

Although pixel binning scheme based on specific numbers of pixels and specific binning sizes has been described with reference to FIGS. 4A through 4D, example embodiments are not limited thereto. Therefore, the number of pixels and the binning size may be changed according to example embodiments. In addition, although N*N pixel binning scheme has been described with reference to FIGS. 4B through 4D where N is a natural number greater than or equal to two, example embodiments are not limited thereto. N*M pixel binning scheme may also be employed where M is a natural number different from N.

Figure 5:
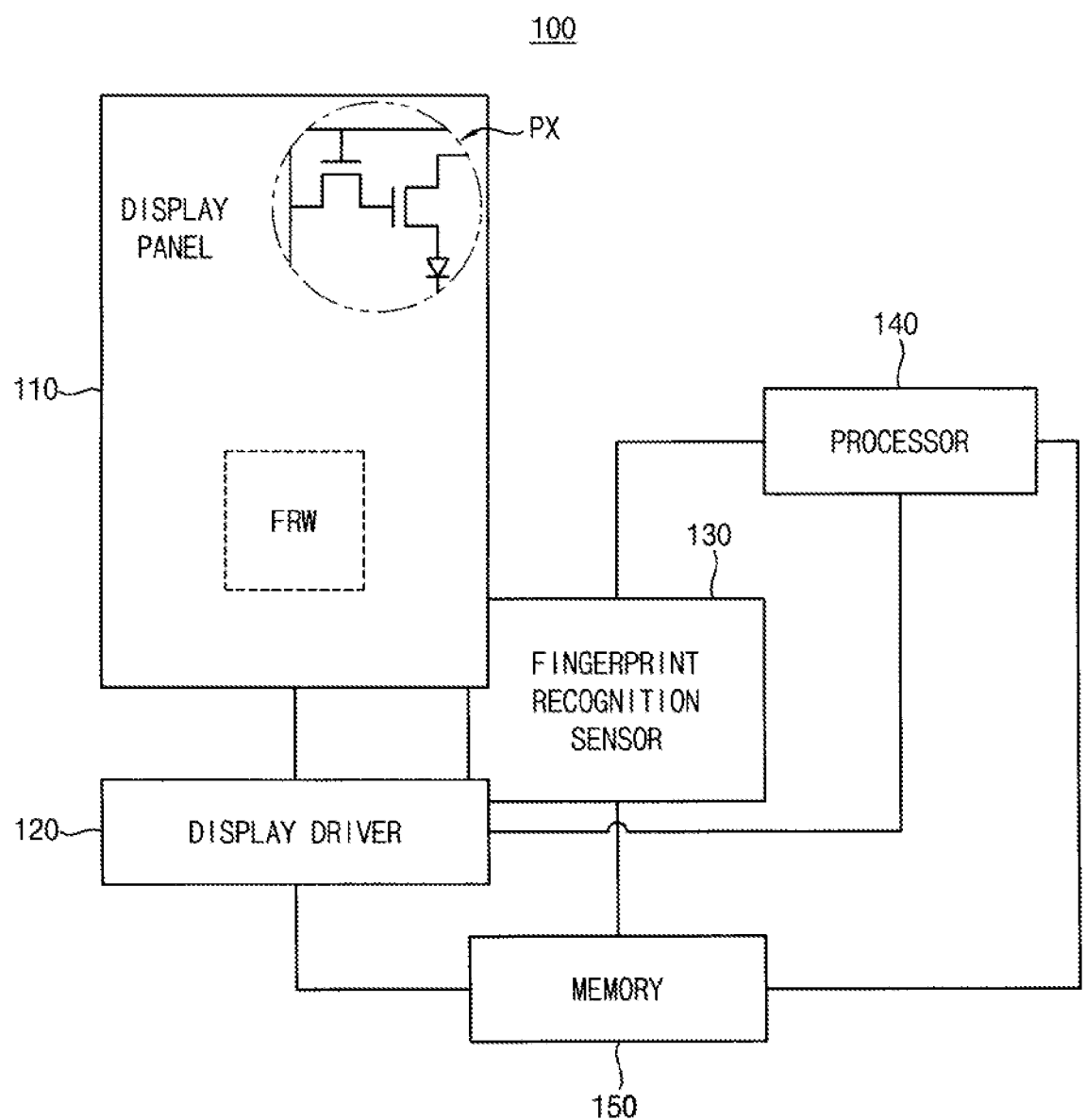
FIG. 5 is a block diagram illustrating an example of the electronic device of FIG. 2.

FIG. 5 is a block diagram illustrating an example of the electronic device of FIG. 2.

Referring to FIG. 5, an electronic device 100 includes a display panel 110, a fingerprint recognition sensor 130 and a processor 140. The electronic device 100 may further include a display driver 120 and a memory 150.

The display panel 110 outputs visual information to a user. The display panel 110 may include a plurality of pixels PX which are arranged along rows and columns to display an image. Each pixel may be configured to emit light of a specific color which forms the image. As the plurality of pixels PX emit light together, the display panel 110 may display an image. For example, the plurality of pixels PX may correspond to the plurality of pixels P in FIG. 4A.

In some example embodiments, the display panel 110 may be an electroluminescent display panel. The electroluminescent display panel may be driven with rapid response speed and low power consumption using a light-emitting diode (LED) or an organic light-emitting diode (OLED) that generates light by recombination of electrons and holes. In comparison with a liquid crystal display panel using a backlight unit, the pixels PX of the electroluminescent display panel may emit light by themselves. As a result, the reflected light received through the fingerprint recognition window FRW may be provided to the fingerprint recognition sensor 130 under the display panel 110 through a space (gap) between the pixels PX. Light-emitting diodes or organic light-emitting diodes included in the pixels PX may correspond to the light sources included in the display panel according to example embodiments. However, example embodiments are not limited thereto, and the display panel 110 may be any display panel with a structure in which the reflected light received through the fingerprint recognition window FRW may be provided to the fingerprint recognition sensor 130.

The display driver 120 may control operations of the display panel 110 and may drive the display panel 110. For example, the display driver 120 may suitably drive each pixel of the display panel 110 in response to a command of the processor 140 such that the image is displayed on the display panel 110. For example, the display driver 120 may partially drive the display panel 110 such that pixels corresponding to the fingerprint recognition window FRW emit light. Although not illustrated in FIG. 5, the display driver 120 may include a data driver, a scan driver, a timing controller, a gamma circuit, etc.

The fingerprint recognition sensor 130 may be used to detect a fingerprint. The fingerprint recognition sensor 130 may generate/output an image signal associated with an object which is on the fingerprint recognition window FRW. For example, the fingerprint recognition sensor 130 may operate to obtain an image signal associated with a fingerprint of a finger which contacts or approaches the fingerprint recognition window FRW. For example, the fingerprint recognition sensor 130 may correspond to the fingerprint recognition sensor 130*a*, 130*b*, and 130*c* in FIGS. 3A, 3B and 3C.

The fingerprint recognition sensor 130 may provide a function of optical fingerprint recognition or optics-based fingerprint detection. For example, an image sensor included in the fingerprint recognition sensor 130 may include photodiode(s), which can generate current in response to light.

The processor 140 may control overall operations of the electronic device 100. The processor 140 may process/perform various arithmetic/logical operations to provide functions of the electronic device 100.

The processor 140 may communicate with the display driver 120, the fingerprint recognition sensor 130, and the memory 150. The processor 140 may control operations of the display driver 120, the fingerprint recognition sensor 130, and the memory 150. The processor 140 may process commands, requests, responses, and/or the like, which are associated with operations of the display driver 120, the fingerprint recognition sensor 130, and the memory 150. For example, the processor 140 may provide a variety of information to the display driver 120 to display the image on the display panel 110. For example, the processor 140 may control an operation timing/sequence of the display panel 110 and the fingerprint recognition sensor 130 such that the fingerprint recognition sensor 130 generates the image signal associated with the fingerprint. For example, the processor 140 may generate and analyze image information associated with the fingerprint-based on the image signal output from the fingerprint recognition sensor 130. For example, the processor 140 may store associated data in the memory 150 or may load the associated data from the memory 150.

In some example embodiments, the processor 140 may include one or more special-purpose circuits to perform various operations. Special-purpose circuits may include a field-programmable gate array (FPGA), application-specific integrated chips (ASICs), and/or the like. For example, the processor 140 may include one or more processor cores that can perform various operations. For example, the processor 140 may be implemented with a general-purpose processor, a special-purpose processor, or an application processor.

The memory 150 may store data related to the operation of the electronic device 100. For example, the memory 150 may store the minimum binning size, the maximum binning size, the first binning size, the second binning size, the lookup table, etc. for performing the method of registering fingerprint based on optical fingerprint recognition according to example embodiments.

In some example embodiments, the memory 150 may include at least one of various volatile memories such as a dynamic random access memory (DRAM), a static random access memory (SRAM), or the like. The memory 150 may also include at least one of various nonvolatile memories such as a flash memory, a phase-change random access memory (PRAM), a resistance random access memory (RRAM), a magnetic random access memory (MRAM), a ferroelectric random access memory (FRAM), a nano floating gate memory (NFGM), a polymer random access memory (PoRAM), or the like.

In some example embodiments, the display driver 120, the fingerprint recognition sensor 130, the processor 140 and the memory 150 may be implemented with separate circuits/modules/chips. In other example embodiments, based on a function, some of the display driver 120, the fingerprint recognition sensor 130, the processor 140, and the memory 150 may be combined into one circuit/module/chip, or may be further separated into a plurality of circuits/modules/chips.

The electronic device 100 may perform the method of registering fingerprint based on optical fingerprint recognition described with reference to FIG. 1. For example, the display panel 110 and the display driver 120 may perform step S100 in FIG. 1, the fingerprint recognition sensor 130 may perform steps S200, S500, and S600 in FIG. 1, and the processor 140 may perform S200, S300, S400, S500, and S600 in FIG. 1. In addition, the electronic device 100 may perform a method of registering fingerprint, which will be described with reference to FIGS. 6 through 9, and/or a method of performing optical fingerprint recognition, which will be described with reference to FIGS. 10 through 14.

Figure 6:
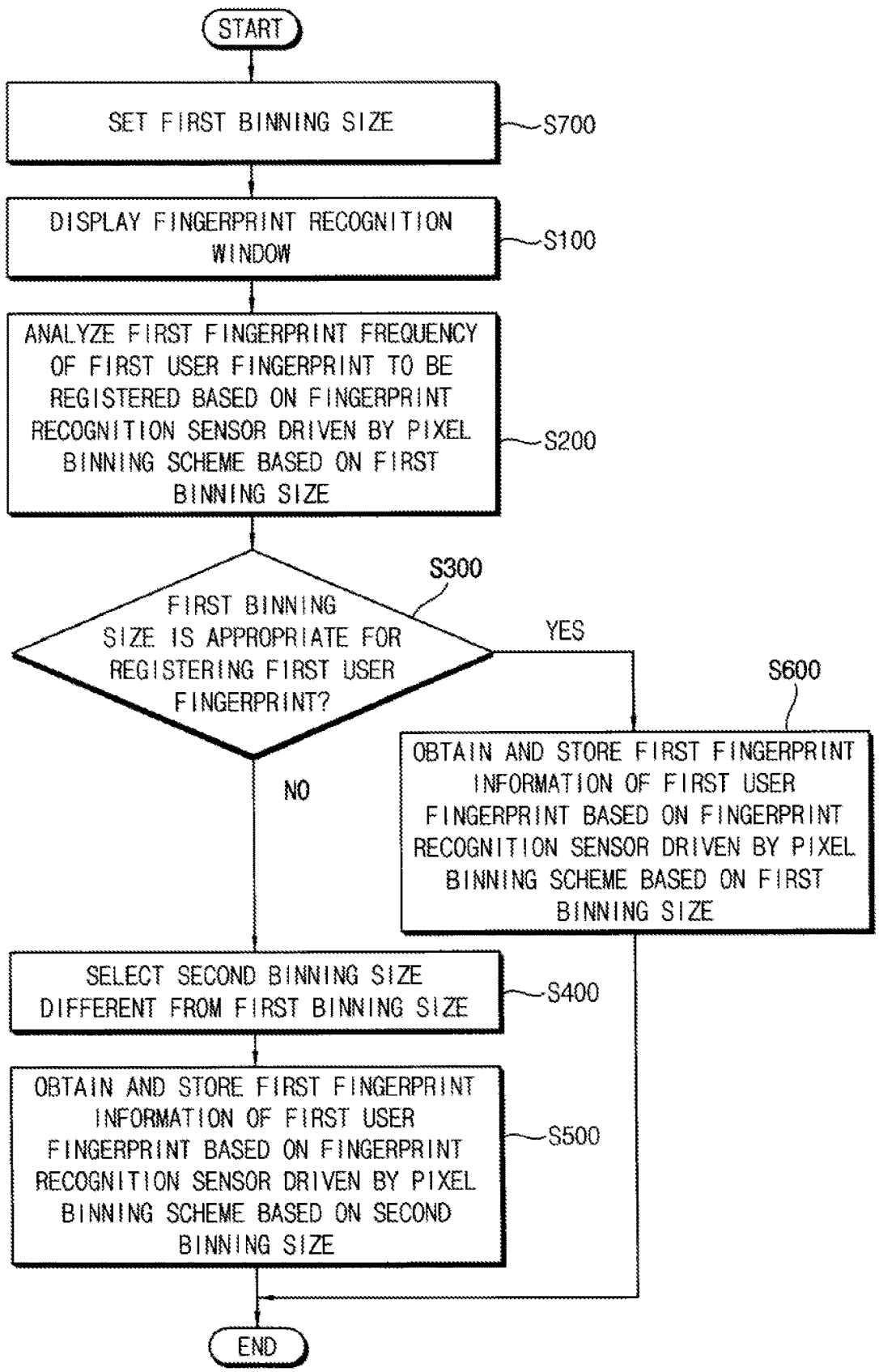
FIG. 6 is a flowchart illustrating a method of registering fingerprint based on optical fingerprint recognition according to example embodiments.

FIG. 6 is a flowchart illustrating a method of registering fingerprint based on optical fingerprint recognition according to example embodiments. The descriptions repeated with FIG. 1 will be omitted.

Referring to FIG. 6, in a method of registering fingerprint based on optical fingerprint recognition according to example embodiments, the first binning size may be set based on the minimum binning size and the maximum binning size (step S700). Steps S100, S200, S300, S400, S500 and S600 after step S700 in FIG. 6 may be substantially the same as steps S100, S200, S300, S400, S500 and S600 in FIG. 1, respectively.

In some example embodiments, an operation of setting the first binning size in step S700 may be performed when the electronic device is manufactured. In this case, the electronic device may include the display panel and the fingerprint recognition sensor. For example, step S700 may be performed by an external test device and/or design device at the time of manufacturing the electronic device. The first binning size may be set and stored at the time of manufacturing the electronic device. After that, an operation of loading the first binning size already stored in the memory 150 may be performed in step S700. In this example, steps S100, S200, S300, S400, S500 and S600 may be performed by loading the stored first binning size.

Figure 7:
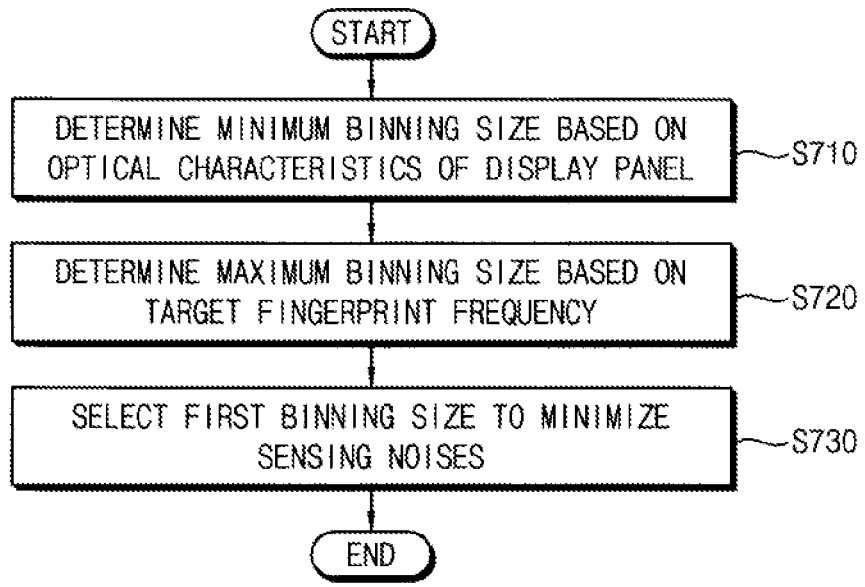
FIG. 7 is a flowchart illustrating an example of setting a first binning size in FIG. 6.

FIG. 7 is a flowchart illustrating an example of setting a first binning size in FIG. 6.

Referring to FIGS. 6 and 7, when setting the first binning size (step S700), the minimum binning size may be determined based on optical characteristics of the display panel (step S710). For example, the optical characteristics of the display panel may include light transmittance of the reflected light. If a size of pixels included in the fingerprint recognition sensor is relatively small, the light transmittance of the display panel is relatively low. Additionally, if the amount of incident light is relatively small, an effective signal for the fingerprint recognition may not be obtained from a single pixel. As a result, the minimum binning size corresponding to the minimum pixel size for obtaining the effective signal may be determined.

The maximum binning size may be determined based on a target fingerprint frequency (step S720). For example, the target fingerprint frequency may include an average value of frequencies due to ridges and valleys of a fingerprint obtained from various samples of fingerprint images. Ridges and valleys of the fingerprint may be distinguishable to perform fingerprint recognition. As a result, the maximum binning size corresponding to the maximum pixel size for distinguishing the ridges and valleys of the fingerprint may be determined.

A value that minimizes sensing noise among values between the minimum binning size and the maximum binning size may be selected as the first binning size (step S730). For example, the first binning size may have a relatively large value compared to the size of the pixels in the fingerprint recognition sensor. A relatively large value of the first binning size may be used to accurately receive a fingerprint image signal to, while being smaller than the maximum size sufficient to distinguish the ridges and valleys of the fingerprint.

Figure 8:
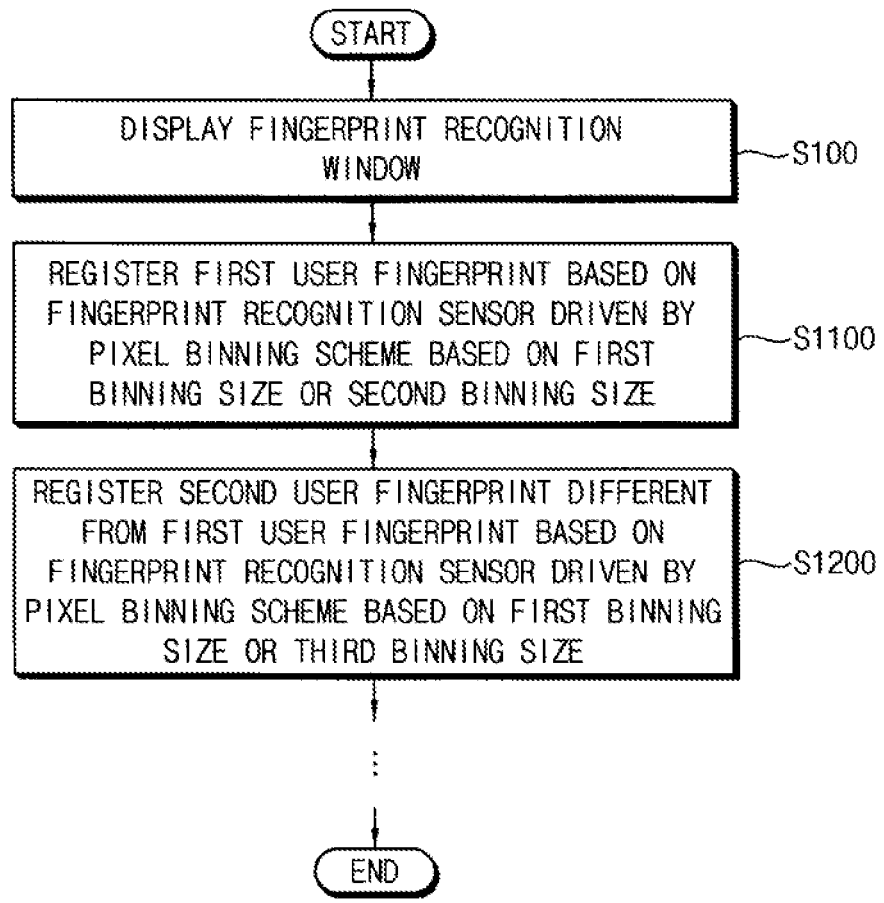
FIG. 8 is a flowchart illustrating a method of registering fingerprint based on optical fingerprint recognition according to example embodiments.

FIG. 8 is a flowchart illustrating a method of registering fingerprint based on optical fingerprint recognition according to example embodiments. The descriptions repeated with FIG. 1 will be omitted.

Referring to FIG. 8, in a method of registering fingerprint based on optical fingerprint recognition according to example embodiments, step S100 in FIG. 8 may be substantially the same as step S100 in FIG. 1.

The first user fingerprint is registered or enrolled based on the fingerprint recognition sensor driven by a pixel binning scheme based on the first binning size or the second binning size (step S1100). For example, step S1100 in FIG. 8 may include steps S200, S300, S400, S500, and S600 in FIG. 1.

A second user fingerprint different from the first user fingerprint is registered or enrolled based on the fingerprint recognition sensor driven by a pixel binning scheme based on the first binning size or a third binning size (step S1200). For example, as will be described with reference to FIG. 9, step S1200 in FIG. 8 may be similar to step S1100 in FIG. 8.

Figure 9:
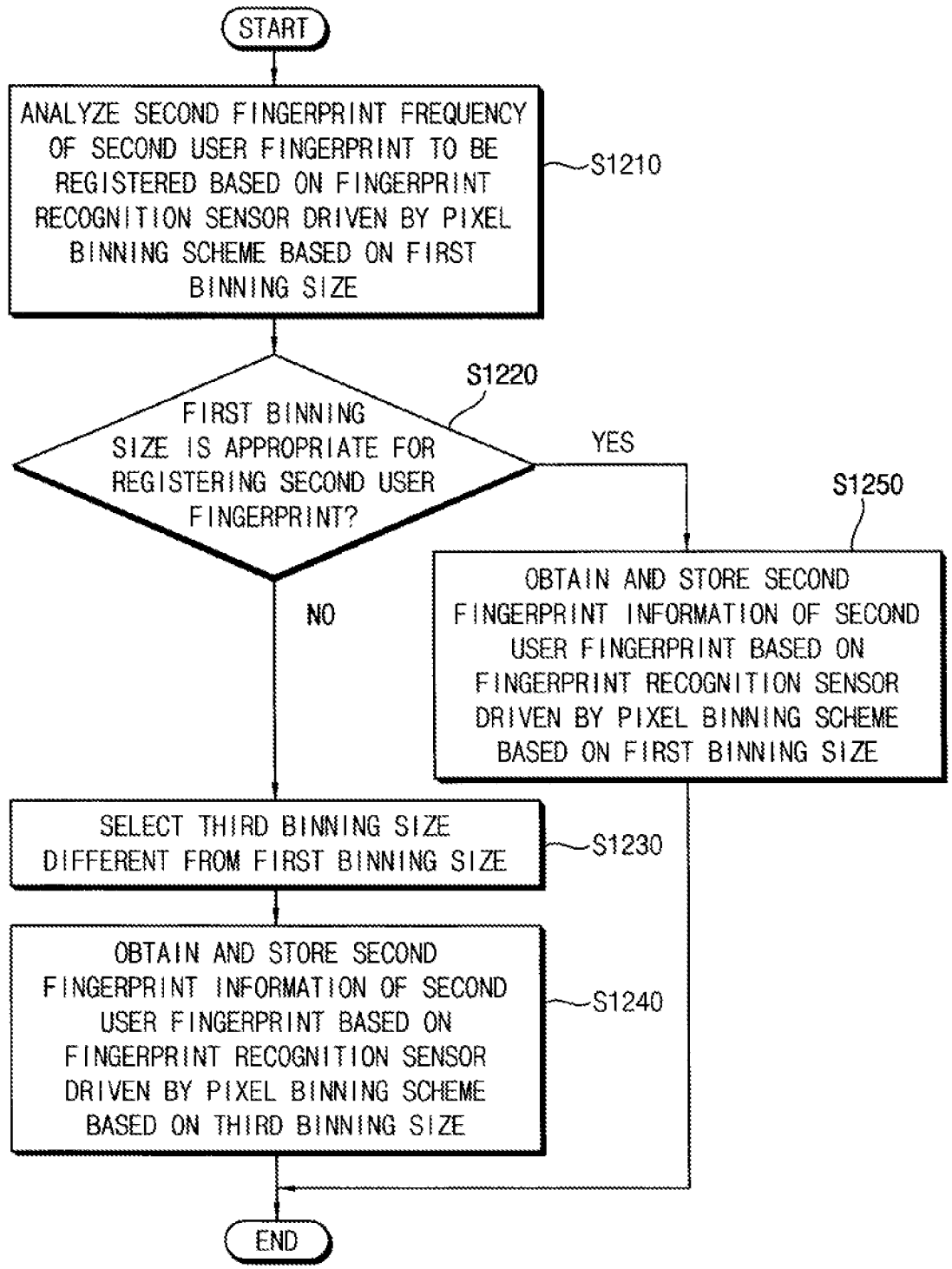
FIG. 9 is a flowchart illustrating an example of registering a second user fingerprint in FIG. 8.

FIG. 9 is a flowchart illustrating an example of registering a second user fingerprint in FIG. 8.

Referring to FIGS. 8 and 9, when registering the second user fingerprint (step S1200), a second fingerprint frequency of the second user fingerprint to be registered may be analyzed. The second user fingerprint analyzation may be based on reflected light received through the fingerprint recognition window using the fingerprint recognition sensor driven by the pixel binning scheme based on the first binning size (step S1210). Additionally, to register the second user fingerprint (step S1220), the first binning size is determined based on the second fingerprint frequency.

When the first binning size is not appropriate for registering the second user fingerprint (step S1220: NO), the third binning size, which is different from the first binning size, may be selected (step S1230). The second fingerprint information about the second user fingerprint may be obtained based on reflected light received through the fingerprint recognition window using the fingerprint recognition sensor driven by the pixel binning scheme based on the third binning size to store the second fingerprint information (step S1240).

When the first binning size is appropriate for registering the second user fingerprint (step S1220: YES), the second fingerprint information may be obtained. The second fingerprint information may be based on reflected light received through the fingerprint recognition window using the fingerprint recognition sensor driven by the pixel binning scheme, based on the first binning size, to store the second fingerprint information (step S1250).

Steps S1210, S1220, S1230, S1240, and S1250 in FIG. 9 may be substantially the same as steps S200, S300, S400, S500, and S600 in FIG. 1, respectively. Thus, repeated descriptions will be omitted.

In some example embodiments, the third binning size may be substantially equal to the second binning size. In other words, the first and second user fingerprints may be registered based on the same binning size. In other example embodiments, the third binning size may be different from the second binning size. In other words, the first and second user fingerprints may be registered based on different binning sizes.

In the method of registering a fingerprint based on optical fingerprint recognition, according to example embodiments, an optimized binning size may be determined for each user fingerprint when a plurality of user fingerprints are to be registered. The fingerprint registration may be performed based on the optimized binning size.

Although not illustrated in FIG. 8, when a third user fingerprint, different from the first and second user fingerprints, is to be registered in the example of FIG. 8, an operation of registering the third user fingerprint may be further performed. Registering the third user fingerprint may be based on the fingerprint recognition sensor driven by a pixel binning scheme based on the first binning size or a fourth binning size. Also, additional user fingerprints may be registered in a similar manner. In addition, although not illustrated in FIG. 8, step S700 described with reference to FIG. 6 may be further performed in the example of FIG. 8.

Figure 10:
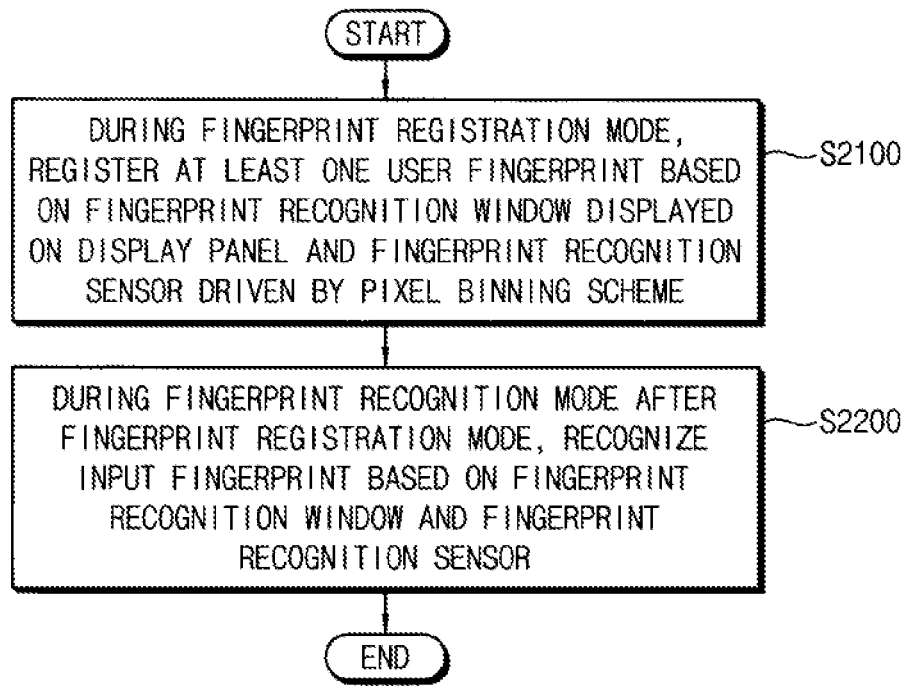
FIG. 10 is a flowchart illustrating a method of performing optical fingerprint recognition according to example embodiments.

FIG. 10 is a flowchart illustrating a method of performing optical fingerprint recognition according to example embodiments.

Referring to FIG. 10, a method of performing optical fingerprint recognition according to example embodiments is performed by an electronic device that includes a display panel and a fingerprint recognition sensor. The electronic device may be the electronic device described with reference to FIGS. 2 through 5.

In the method of performing optical fingerprint recognition according to example embodiments, during a fingerprint registration mode, at least one user fingerprint is registered based on a fingerprint recognition window displayed on the display panel and the fingerprint recognition sensor driven by a pixel binning scheme (step S2100). For example, the fingerprint registration mode may be entered based on a predetermined request. For example, step S2100 in FIG. 10 may be performed based on the method of registering fingerprint based on optical fingerprint recognition described with reference to FIGS. 1 and 6 through 9. The optimized binning size may be determined for each user fingerprint, and the fingerprint registration can be efficiently performed based on the optimized binning size.

During a fingerprint recognition mode after the fingerprint registration mode, an input fingerprint is recognized based on the fingerprint recognition window using the fingerprint recognition sensor (Step S2200). For example, the fingerprint recognition mode may be entered based on a predetermined request. For example, the request may be associated with a signal or an action that directs to detect a fingerprint.

For example, the request may occur when any input is received from a user by the electronic device 100 when a signal/command is generated in the electronic device 100 based on the received input, and/or the like. For example, the request may occur when the user contacts or approaches any area on the touch sensor panel or the display panel 110 through the finger 10 (e.g., the request may occur in response to a touch of the finger 10, or any other suitable object). For example, the request may occur when the finger 10 acts a specific motion or gesture in the vicinity of the electronic device 100. For example, the request may occur when the electronic device 100 moves in a specific manner. However, example embodiments are not limited thereto, and the request may be changed or modified to recognize directing of fingerprint detection.

For example, the request may occur while the electronic device 100 is in an idle state or the display panel 110 is not driven. For example, the request may occur while the display panel 110 is in a stand-by mode. Herein, the stand-by mode may mean an operation mode where the display panel 110 displays a reduced or the minimal amount of information (e.g., a current time, a date, and/or the like), and may be also called as an "Always ON display (AOD)" mode, an "active display mode", and/or the like. For example, the request may occur while the display panel 110 is in a normal mode. Herein, the normal mode may mean an operation mode where the display panel 110 displays a variety of information according to intentions of the user.

Figure 11:
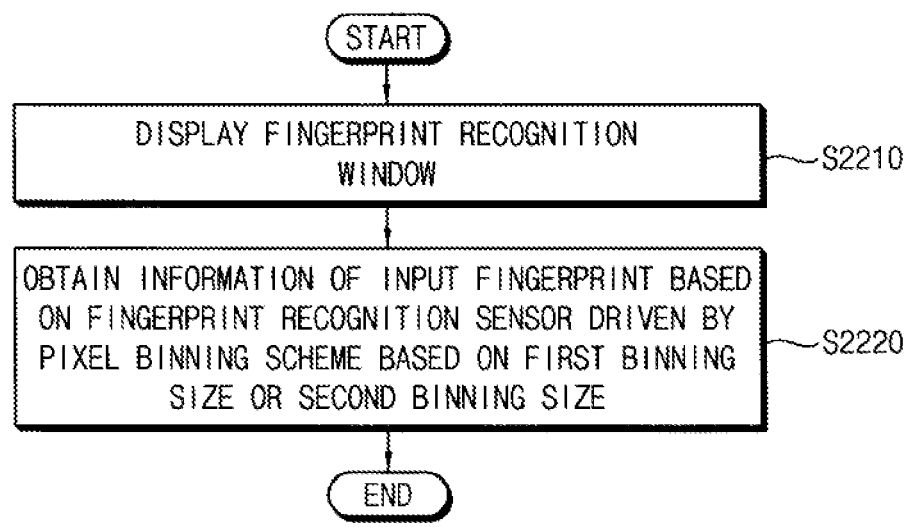
FIGS. 11 and 12 are flowcharts illustrating examples of recognizing an input fingerprint in FIG. 10.
Figure 12:
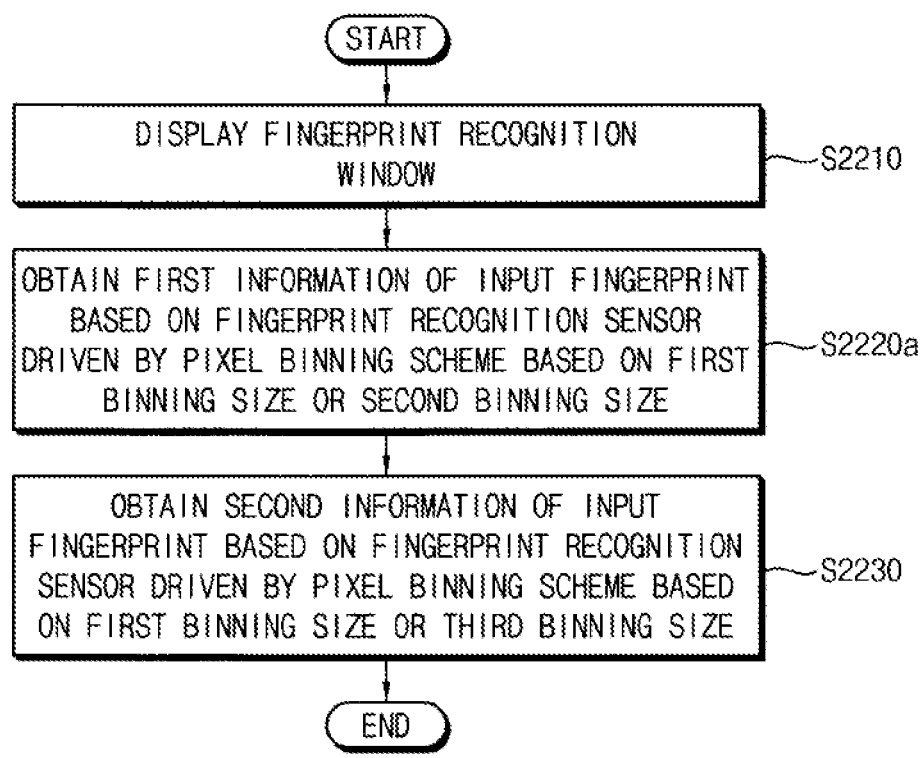

FIGS. 11 and 12 are flowcharts illustrating examples of recognizing an input fingerprint in FIG. 10. FIG. 11 illustrates an example of recognizing the input fingerprint when step S2100 in FIG. 10 is performed based on the example of FIG. 1. FIG. 12 illustrates an example of recognizing the input fingerprint when step S2100 in FIG. 10 is performed based on the example of FIG. 8.

Referring to FIGS. 10 and 11, when recognizing the input fingerprint (step S2200), the fingerprint recognition window may be displayed on the partial region of the display panel (step S2210). Step S2210 in FIG. 11 may be substantially the same as step S100 in FIG. 1. Thus, repeated descriptions will be omitted.

Information about the input fingerprint may be obtained based on reflected light received through the fingerprint recognition window using the fingerprint recognition sensor driven by the pixel binning scheme based on the first binning size or the second binning size (step S2220). For example, when the first fingerprint information about the first user fingerprint is registered by step S500 in FIG. 1, information about the input fingerprint may be obtained based on the fingerprint recognition sensor driven by the pixel binning scheme based on the second binning size. When the first fingerprint information is registered by step S600 in FIG. 1, information about the input fingerprint may be obtained based on the fingerprint recognition sensor driven by the pixel binning scheme based on the first binning size.

Referring to FIGS. 10 and 12, when recognizing the input fingerprint (step S2200), the fingerprint recognition window may be displayed on the partial region of the display panel (step S2210). First information about the input fingerprint may be obtained based on reflected light received through the fingerprint recognition window using the fingerprint recognition sensor driven by the pixel binning scheme based on the first binning size or the second binning size (step S2220a). Steps S2210 and S2220a in FIG. 12 may be substantially the same as steps S2210 and S2220 in FIG. 11, respectively. Thus, repeated descriptions will be omitted.

Second information about the input fingerprint may be obtained based on reflected light received through the fingerprint recognition window using the fingerprint recognition sensor driven by the pixel binning scheme based on the first binning size or the third binning size (step S2230). For example, when the second fingerprint information about the second user fingerprint is registered by step S1240 in FIG. 9, the second information about the input fingerprint may be obtained based on the fingerprint recognition sensor driven by the pixel binning scheme based on the third binning size. When the second fingerprint information is registered by step S1250 in FIG. 9, the second information about the input fingerprint may be obtained based on the fingerprint recognition sensor driven by the pixel binning scheme based on the first binning size.

The input fingerprint may not be confirmed to be the first user fingerprint or the second user fingerprint when the first and second user fingerprints are registered based on different binning sizes. As a result, information about the input fingerprint may be obtained twice based on different binning sizes and the input fingerprint may be recognized based on the obtained information. Similarly, when a plurality of user fingerprints are registered based on three or more different binning sizes, information about the input fingerprint may be obtained multiple times based on different binning sizes.

In some example embodiments, when the first and second user fingerprints are registered based on the same binning size, step S2230 may be omitted. For example, when the third binning size is substantially equal to the second binning size, or when both the first and second user fingerprints are registered based on the first binning size.

Figure 13:
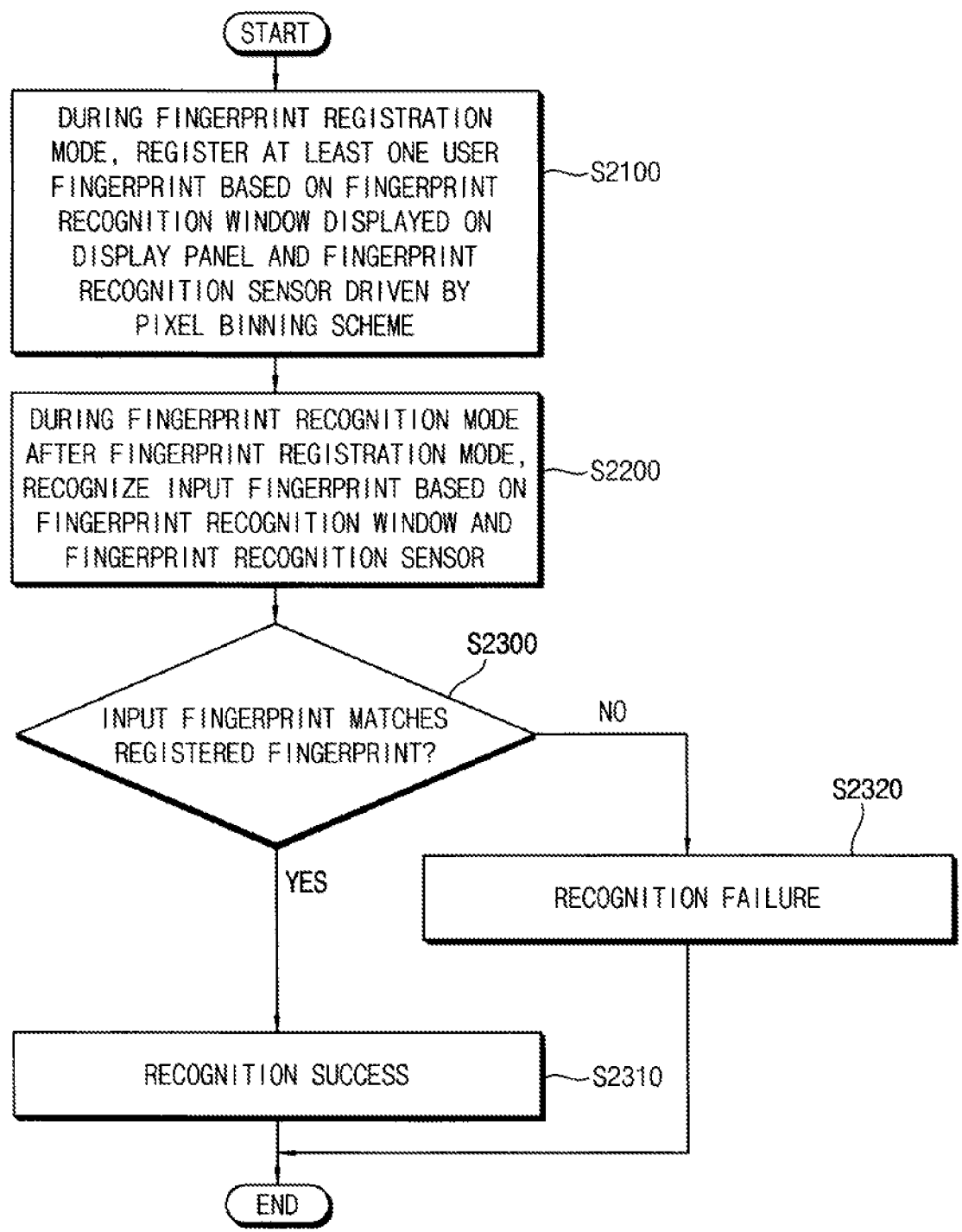

FIGS. 13 and 14 are flowcharts illustrating a method of performing optical fingerprint recognition according to example embodiments. The descriptions repeated with FIG. 10 will be omitted.

Referring to FIG. 13, in a method of performing optical fingerprint recognition according to example embodiments, steps S2100 and S2200 in FIG. 13 may be substantially the same as steps S2100 and S2200 in FIG. 10, respectively.

The fingerprint recognition mode may determine whether the input fingerprint matches the at least one user fingerprint registered in the fingerprint registration mode (step S2300). For example, a fingerprint of an authenticated user stored in advance and the input fingerprint recognized in the fingerprint recognition mode may be compared to determine whether two fingerprints are substantially identical or the same.

When the input fingerprint matches the at least one user fingerprint (step S2300: YES), the fingerprint recognition is determined as a success (step S2310), and appropriate subsequent fingerprint recognition operations may be performed.

When the input fingerprint does not match the at least one user fingerprint (step S2300: NO), the fingerprint recognition is determined as a failure (step S2320) and the fingerprint recognition operation may be terminated. In some example embodiments, the fingerprint recognition may be repeated until the number of times that the fingerprint recognition fails exceeds a predetermined number.

Referring to FIG. 14, a method of performing optical fingerprint recognition according to example embodiments, steps S2100 and S2200 in FIG. 14 may be substantially the same as steps S2100 and S2200 in FIG. 10, respectively.

An image may be displayed on at least a portion of display panel (step S2400). In some example embodiments, step S2400 may be performed substantially simultaneously with at least one of steps S2100 and S2200, and/or an image may be displayed on the partial region where the fingerprint recognition window is disposed.

FIGS. 15A and 15B are diagrams illustrating example processes for a method of performing optical fingerprint recognition according to example embodiments. FIG. 15A illustrates an operation in the fingerprint registration mode. FIG. 15B illustrates the operation in the fingerprint recognition mode.

Referring to FIG. 15A, a predetermined first request may be generated or may occur to enter the fingerprint registration mode and to perform the fingerprint registration (step S2100). For example, the first request may occur by selecting a fingerprint recognition menu (FRM) displayed on the display panel 110 and used to enter the fingerprint registration mode.

For example, the user may not know a location at which the fingerprint recognition sensor 130 is disposed. As a result, in some cases, the user may contact or approach a region other than the fingerprint recognition window FRW through the finger 10. The electronic device 100 may determine that a touched area does not coincide with the fingerprint recognition window FRW. The electronic device 100 may then display a reference image RI by partially driving the display panel 110 under control of the display driver 120. The reference image RI may be displayed to inform the user of the location at which the fingerprint recognition sensor 130 is disposed. The reference image RI may be displayed on some or part of the portions of the fingerprint recognition window FRW.

After that, the user may contact or approach, through the finger 10, the fingerprint recognition window FRW in which the reference image RI is displayed. The electronic device 100 may determine that a touched area coincides with the fingerprint recognition window FRW. The electronic device 100 may then emit light by partially driving the display panel 110 under control of the display driver 120. The electronic device 100 may generate an image signal associated with the finger 10 which is on the fingerprint recognition window FRW, based on the emitted light. The electronic device 100 may register a fingerprint based on reflected light of the fingerprint received through the fingerprint recognition window FRW.

Referring to FIG. 15B, a predetermined second request may be generated or may occur to enter the fingerprint recognition mode and to perform the fingerprint recognition (step S2200). For example, the second request may occur in response to contact or proximity of the finger 10 on or to any area on the display panel 110. For example, the second request may occur while the display panel 110 is in a stand-by mode (e.g., while the display panel 110 displays the reduced or the minimal amount of information such as a current time).

Similar to that described with reference to FIG. 15A, the user may not know the location at which the fingerprint recognition sensor 130 is disposed. As a result, in some cases, the user may contact or approach a region other than the fingerprint recognition window FRW through the finger 10. The electronic device 100 may determine that a touched area does not coincide with the fingerprint recognition window FRW. The electronic device 100 may then display the reference image RI by partially driving the display panel 110 under control of the display driver 120.

After that, the user may contact or approach, through the finger 10, the fingerprint recognition window FRW in which the reference image RI is displayed. The electronic device 100 may determine that the touched area coincides with the fingerprint recognition window FRW, and may emit light by partially driving the display panel 110 under control of the display driver 120. The electronic device 100 may generate an image signal associated with the finger 10 which is on the fingerprint recognition window FRW, based on the emitted light. The electronic device 100 may recognize a fingerprint based on reflected light of the fingerprint received through the fingerprint recognition window FRW. In addition, the electronic device 100 may determine whether the fingerprint recognized in the fingerprint recognition mode is the fingerprint of the authenticated user (step S2300).

In some example embodiments, the reference image RI may be provided in association with a function of fingerprint detection. For example, since the function of fingerprint detection is associated with an issue of user authentication and security, the function of fingerprint detection may be processed with the highest priority. In some example embodiments, the electronic device 100 may suitably drive the display panel 110 under control of the display driver 120, such that an interface (e.g., the contact or proximity of the finger 10) associated with the reference image RI is processed prior to an interface (e.g., a time setting) associated with the stand-by mode. In some cases, the user may contact or approach an area other than the fingerprint recognition window FRW again, even if the reference image RI is displayed. In this case, the electronic device 100 may display an error response to inform the user that a touched area does not coincide with the fingerprint recognition window FRW.

As will be appreciated by those skilled in the art, the inventive concept may be embodied as a system, method, computer program product, and/or a computer program product embodied in one or more computer-readable medium(s) with computer readable program code embodied thereon. The computer-readable program code may be provided to a processor of a general-purpose computer, special-purpose computer, or other programmable data processing apparatus. The computer-readable medium may be a computer-readable signal medium or a computer-readable storage medium. The computer-readable storage medium may be any tangible medium that can contain or store a program for use by or in connection with an instruction execution system, apparatus, or device. For example, the computer-readable medium may be a non-transitory computer-readable medium.

Figure 16:
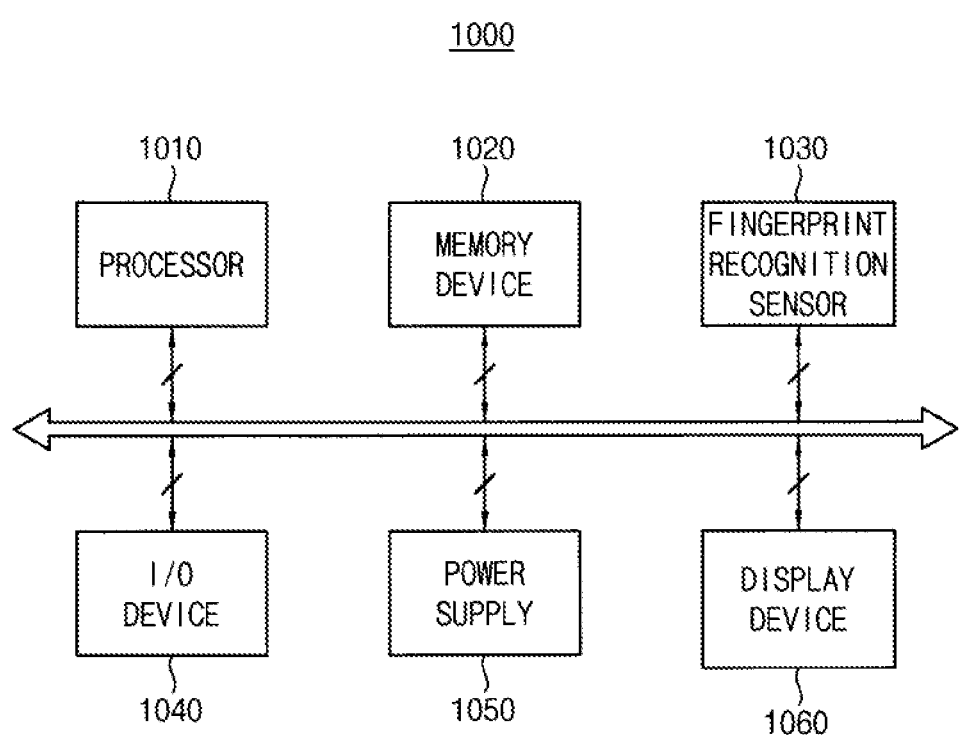
FIG. 16 is a block diagram illustrating an electronic device according to example embodiments.

FIG. 16 is a block diagram illustrating an electronic device according to example embodiments.

Referring to FIG. 16, an electronic device 1000 may include a processor 1010, a memory device 1020, a fingerprint recognition sensor 1030, an input/output (I/O) device 1040, a power supply 1050 and a display device 1060. The electronic device 1000 may further include a plurality of ports for communicating a video card, a sound card, a memory card, a universal serial bus (USB) device, other electronic devices, etc.

The processor 1010 controls operations of the electronic device 1000. The processor 1010 may execute an operating system and at least one application to provide an internet browser, games, videos, or the like. The memory device 1020 may store data for operations of the electronic device 1000. The I/O device 1040 may include an input device such as a keyboard, a keypad, a mouse, a touchpad, a touchscreen, a remote controller, etc., and an output device such as a printer, a speaker, etc. The power supply 1050 may provide power for operations of the electronic device 1000.

The display device 1060 includes a display panel. The display panel, the fingerprint recognition sensor 1030, the processor 1010 and the memory device 1020 in FIG. 16 may correspond to the display panel 110, the fingerprint recognition sensor 130, the processor 140 and the memory 150 in FIG. 5, respectively, and may perform the method of registering fingerprint according to example embodiments and the method of performing the optical fingerprint recognition according to example embodiments.

The inventive concept may be applied to various electronic devices and systems that perform the optical fingerprint recognition. For example, the inventive concept may be applied to systems such as a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of registering a fingerprint based on optical fingerprint recognition, the method comprising:
displaying a fingerprint recognition window on at least a part of a display panel;
analyzing a first fingerprint frequency of a first user fingerprint to be registered based on reflected light received through the fingerprint recognition window using a fingerprint recognition sensor driven by a pixel binning scheme based on a first binning size, wherein the first fingerprint frequency corresponds to a density of ridges and valleys in the first user fingerprint;
determining, based on the first fingerprint frequency, whether the first binning size is appropriate for registering the first user fingerprint, wherein the first binning size is determined to be appropriate when the first fingerprint frequency is above a threshold frequency and the first binning size is determined to be not appropriate when the first fingerprint frequency is below the threshold frequency;
when the first binning size is not appropriate for registering the first user fingerprint based on the first fingerprint frequency being below the threshold frequency, selecting a second binning size that is larger than the first binning size, wherein the second binning size includes larger pixels or more pixels than the first binning size; and
obtaining first fingerprint information of the first user fingerprint based on reflected light received through the fingerprint recognition window using the fingerprint recognition sensor driven by a pixel binning scheme based on the second binning size.

2. The method of claim 1, further comprising:
setting the first binning size based on a minimum binning size and a maximum binning size.

3. The method of claim 2, wherein setting the first binning size includes:
determining the minimum binning size based on optical characteristics of the display panel;
determining the maximum binning size based on a target fingerprint frequency; and
selecting a value that minimizes sensing noise among values between the minimum binning size and the maximum binning size as the first binning size.

4. The method of claim 2, wherein setting the first binning size is performed during manufacturing of an electronic device including the display panel and the fingerprint recognition sensor.

5. The method of claim 2, wherein the first binning size and the second binning size are between the minimum binning size and the maximum binning size.

6. The method of claim 1, further comprising:
when the first binning size is appropriate for registering the first user fingerprint, obtaining the first fingerprint information based on reflected light received through the fingerprint recognition window using the fingerprint recognition sensor driven by the pixel binning scheme based on the first binning size to store the first fingerprint information.

7. The method of claim 1, further comprising:
analyzing a second fingerprint frequency of a second user fingerprint to be registered based on reflected light received through the fingerprint recognition window using the fingerprint recognition sensor driven by the pixel binning scheme based on the first binning size, the second user fingerprint being different from the first user fingerprint;
determining based on the second fingerprint frequency whether the first binning size is appropriate for registering the second user fingerprint;
when the first binning size is not appropriate for registering the second user fingerprint, selecting a third binning size different from the first binning size; and
obtaining second fingerprint information of the second user fingerprint based on reflected light received through the fingerprint recognition window using the fingerprint recognition sensor driven by a pixel binning scheme based on the third binning size to store the second fingerprint information.

8. The method of claim 7, wherein the third binning size is equal to the second binning size.

9. The method of claim 7, wherein the third binning size is different from the second binning size.

10. The method of claim 7, further comprising:
when the first binning size is appropriate for registering the second user fingerprint, obtaining the second fingerprint information based on reflected light received through the fingerprint recognition window using the fingerprint recognition sensor driven by the pixel binning scheme based on the first binning size to store the second fingerprint information.

11. The method of claim 1, wherein:
the display panel includes a first surface on which an image is displayed and a second surface opposite to the first surface, and
the fingerprint recognition sensor is disposed under the second surface of the display panel.

12. The method of claim 11, wherein the fingerprint recognition sensor includes:
an image sensor disposed under the second surface of the display panel.

13. The method of claim 12, wherein the fingerprint recognition sensor further includes:
a lens disposed between the second surface of the display panel and the image sensor.

14. The method of claim 12, wherein the fingerprint recognition sensor further includes:
an optical filter disposed between the second surface of the display panel and the image sensor.

15. A method of performing optical fingerprint recognition, the method comprising:
during a fingerprint registration mode, registering at least one user fingerprint based on a fingerprint recognition window displayed on a display panel and a fingerprint recognition sensor driven by a pixel binning scheme; and
during a fingerprint recognition mode after the fingerprint registration mode, recognizing an input fingerprint based on the fingerprint recognition window using the fingerprint recognition sensor,
wherein registering the at least one user fingerprint includes:
displaying the fingerprint recognition window on at least a part of the display panel;
analyzing a first fingerprint frequency of a first user fingerprint to be registered based on reflected light received through the fingerprint recognition window using the fingerprint recognition sensor driven by a pixel binning scheme based on a first binning size, wherein the first fingerprint frequency corresponds to a density of ridges and valleys in the first user fingerprint;

determining based on the first fingerprint frequency whether the first binning size is appropriate for registering the first user fingerprint, wherein the first binning size is determined to be appropriate when the first fingerprint frequency is above a threshold frequency and the first binning size is determined to be not appropriate when the first fingerprint frequency is below the threshold frequency;

when the first binning size is not appropriate for registering the first user fingerprint based on the first fingerprint frequency being below the threshold frequency, selecting a second binning size that is larger than the first binning size, wherein the second binning size includes larger pixels or more pixels than the first binning size; and obtaining first fingerprint information of the first user fingerprint based on reflected light received through the fingerprint recognition window using the fingerprint recognition sensor driven by a pixel binning scheme based on the second binning size to store the first fingerprint information.

16. The method of claim 15, wherein recognizing the input fingerprint includes:

displaying the fingerprint recognition window on a partial region of the display panel; and obtaining information of the input fingerprint based on reflected light received through the fingerprint recognition window using the fingerprint recognition sensor driven by the pixel binning scheme based on the second binning size.

17. The method of claim 15, wherein registering the at least one user fingerprint further includes:

analyzing a second fingerprint frequency of a second user fingerprint to be registered based on reflected light received through the fingerprint recognition window using the fingerprint recognition sensor driven by the pixel binning scheme based on the first binning size, the second user fingerprint being different from the first user fingerprint;

determining based on the second fingerprint frequency whether the first binning size is appropriate for registering the second user fingerprint;

when the first binning size is not appropriate for registering the second user fingerprint, selecting a third binning size different from the first binning size; and obtaining second fingerprint information of the second user fingerprint based on reflected light received through the fingerprint recognition window using the fingerprint recognition sensor driven by a pixel binning scheme based on the third binning size to store the second fingerprint information.

18. The method of claim 17, wherein recognizing the input fingerprint includes:

displaying the fingerprint recognition window on a partial region of the display panel;

obtaining first information of the input fingerprint based on reflected light received through the fingerprint recognition window using the fingerprint recognition sensor driven by the pixel binning scheme based on the second binning size; and obtaining second information of the input fingerprint based on reflected light received through the fingerprint recognition window using the fingerprint recognition sensor driven by the pixel binning scheme based on the third binning size.

19. The method of claim 15, further comprising:

determining whether the input fingerprint recognized in the fingerprint recognition mode matches the at least one user fingerprint registered in the fingerprint registration mode.

20. An electronic device comprising:

a display panel configured to display an image and to display a fingerprint recognition window on a partial region;

a fingerprint recognition sensor configured to be driven by a pixel binning scheme and to perform a fingerprint registration and a fingerprint recognition; and a processor configured to control operations of the display panel and the fingerprint recognition sensor, wherein the processor is configured to analyze a first fingerprint frequency of a first user fingerprint to be registered based on reflected light received through the fingerprint recognition window using a fingerprint recognition sensor driven by a pixel binning scheme based on a first binning size, to determine based on the first fingerprint frequency whether the first binning size is appropriate for registering the first user fingerprint, wherein the first binning size is determined to be appropriate when the first fingerprint frequency is above a threshold frequency, and the first binning size is determined to be not appropriate when the first fingerprint frequency is below the threshold frequency, to select a second binning size that is larger than the first binning size when the first binning size is not appropriate for registering the first user fingerprint based on the first fingerprint frequency being below the threshold frequency, wherein the second binning size includes larger pixels or more pixels than the first binning size, and to obtain first fingerprint information of the first user fingerprint based on reflected light received through the fingerprint recognition window using the fingerprint recognition sensor driven by a pixel binning scheme based on the second binning size to store the first fingerprint information, wherein the first fingerprint frequency corresponds to a density of ridges and valleys in the first user fingerprint.

* * * * *